(12) United States Patent
Fullerton et al.

(10) Patent No.: US 9,371,923 B2
(45) Date of Patent: Jun. 21, 2016

(54) MAGNETIC VALVE ASSEMBLY

(71) Applicants: Larry W Fullerton, New Hope, AL (US); Mark D Roberts, Huntsville, AL (US)

(72) Inventors: Larry W Fullerton, New Hope, AL (US); Mark D Roberts, Huntsville, AL (US)

(73) Assignee: Correlated Magnetics Research, LLC, Huntsville, AL (US)

( * ) Notice: Subject to any disclaimer, the term of this patent is extended or adjusted under 35 U.S.C. 154(b) by 15 days.

(21) Appl. No.: 14/472,945

(22) Filed: Aug. 29, 2014

(65) Prior Publication Data

US 2014/0373950 A1 Dec. 25, 2014

Related U.S. Application Data

(63) Continuation-in-part of application No. 14/198,226, filed on Mar. 5, 2014, which is a continuation-in-part of application No. 14/103,760, filed on Dec. 11, 2013, now Pat. No. 9,202,616, which is a (Continued)

(51) Int. Cl.
*F16K 31/08* (2006.01)
*F16K 11/14* (2006.01)
*H01F 7/02* (2006.01)

(52) U.S. Cl.
CPC .............. *F16K 11/14* (2013.01); *H01F 7/0242* (2013.01); *F16K 31/086* (2013.01); *F16K 31/088* (2013.01); *Y10T 137/86815* (2015.04); *Y10T 137/86823* (2015.04)

(58) Field of Classification Search
CPC ............................... F16K 31/06; F16K 31/088
USPC ............................ 137/625.4, 625.41; 251/65
See application file for complete search history.

(56) References Cited

U.S. PATENT DOCUMENTS 93,931 A 8/1869 Westcott
361,248 A 4/1887 Winton (Continued)

FOREIGN PATENT DOCUMENTS

CN 1615573 5/2005
DE 2938782 4/1981

(Continued)

OTHER PUBLICATIONS

Atallah, K, Calverley, S.D., D. Howe, 2004, "Design, analysis and realisation of a high-performance magnetic gear", IEE Proc.-Electr. Power Appl., vol. 151, No. 2, Mar. 2004.

(Continued)

*Primary Examiner* — John Fox
(74) *Attorney, Agent, or Firm* — Vector IP Law Group; Robert S. Babayi

(57) ABSTRACT

A valve assembly comprises a sealed container connected to a hot water supply line and a cold water supply line. The sealed container has an outlet for supplying at least one of hot water or cold water to a faucet. A valve mechanism is located inside the sealed container comprising a stationary mixing part and a moveable mixing part. A magnetic coupling adapter has a first magnetic structure located outside of a wall of the sealed container. A first magnetic structure is made of a first magnetizable material having a first plurality of first printed maxels having a first polarity pattern. A second magnetic structure located inside the wall of the sealed container is made of a second magnetizable material having a second plurality of second printed maxels having a second polarity pattern that is complementary to the first polarity pattern. The first magnetic structure and second magnetic structure are magnetically coupled across the wall of the sealed container. A first adapter interface component located outside of the wall of the sealed container is associated with the first magnetic structure. A second adapter interface component located inside the wall of the sealed container is associated with the second magnetic structure and the moveable mixing part. A movement control mechanism includes a moveable handle associated with the first adapter interface, which is configured to control a movement of the magnetic coupling adapter and thereby a movement of the moveable mixing part to control flow and mixing of the hot and cold water.

20 Claims, 13 Drawing Sheets

Related U.S. Application Data continuation-in-part of application No. 13/779,611, filed on Feb. 27, 2013, now Pat. No. 9,202,615, and a continuation-in-part of application No. 14/066,426, filed on Oct. 29, 2013, now Pat. No. 8,957,751, which is a continuation of application No. 13/374,074, filed on Dec. 9, 2011, now Pat. No. 8,576,036, said application No. 14/103,760 is a continuation-in-part of application No. 14/086,924, filed on Nov. 21, 2013, now Pat. No. 8,779,879, which is a continuation-in-part of application No. 14/035,818, filed on Sep. 24, 2013, now Pat. No. 8,872,608, which is a continuation-in-part of application No. 13/959,649, filed on Aug. 5, 2013, now Pat. No. 8,692,637, which is a continuation-in-part of application No. 13/759,695, filed on Feb. 5, 2013, now Pat. No. 8,502,630, which is a continuation of application No. 13/481,554, filed on May 25, 2012, now Pat. No. 8,368,495, which is a continuation-in-part of application No. 13/351,203, filed on Jan. 16, 2012, now Pat. No. 8,314,671, which is a continuation of application No. 13/157,975, filed on Jun. 10, 2011, now Pat. No. 8,098,122, which is a continuation of application No. 12/952,391, filed on Nov. 23, 2010, now Pat. No. 7,961,069, which is a continuation of application No. 12/478,911, filed on Jun. 5, 2009, now Pat. No. 7,843,295, and a continuation of application No. 12/478,950, filed on Jun. 5, 2009, now Pat. No. 7,843,296, and a continuation of application No. 12/478,969, filed on Jun. 5, 2009, now Pat. No. 7,843,297, and a continuation of application No. 12/479,013, filed on Jun. 5, 2009, now Pat. No. 7,839,247, said application No. 12/478,950 is a continuation-in-part of application No. 12/476,952, filed on Jun. 2, 2009, now Pat. No. 8,179,219, said application No. 12/478,911 is a continuation-in-part of application No. 12/476,952, said application No. 12/478,969 is a continuation-in-part of application No. 12/476,952, said application No. 12/479,013 is a continuation-in-part of application No. 12/476,952, which is a continuation-in-part of application No. 12/322,561, filed on Feb. 4, 2009, now Pat. No. 8,115,581, which is a continuation-in-part of application No. 12/358,423, filed on Jan. 23, 2009, now Pat. No. 7,868,721, said application No. 14/103,760 is a continuation-in-part of application No. 13/918,921, filed on Jun. 15, 2013, now Pat. No. 8,841,981, which is a continuation of application No. 13/629,879, filed on Sep. 28, 2012, now Pat. No. 8,514,046, which is a continuation of application No. 13/426,909, filed on Mar. 22, 2012, now Pat. No. 8,279,032, which is a continuation-in-part of application No. 13/179,759, filed on Jul. 11, 2011, now Pat. No. 8,174,347, said application No. 14/103,760 is a continuation-in-part of application No. 14/045,756, filed on Oct. 3, 2013, now Pat. No. 8,810,348, which is a continuation-in-part of application No. 13/240,335, filed on Sep. 22, 2011, now Pat. No. 8,648,681, which is a continuation-in-part of application No. 12/476,952, and a continuation-in-part of application No. 12/895,589, filed on Sep. 30, 2010, now Pat. No. 8,760,250, which is a continuation-in-part of application No. 12/885,450, filed on Sep. 18, 2010, now Pat. No. 7,982,568, and a continuation-in-part of application No. 12/476,952, said application No. 14/045,756 is a continuation-in-part of application No. 13/246,584, filed on Sep. 27, 2011, now Pat. No. 8,760,251, said application No. 12/358,423 is a continuation-in-part of application No. 12/123,718, filed on May 20, 2008, now Pat. No. 7,800,471.

(60) Provisional application No. 61/871,689, filed on Aug. 29, 2013, provisional application No. 61/794,427, filed on Mar. 15, 2013, provisional application No. 61/798,233, filed on Mar. 15, 2013, provisional application No. 61/798,453, filed on Mar. 15, 2013, provisional application No. 61/799,507, filed on Mar. 15, 2013, provisional application No. 61/800,377, filed on Mar. 15, 2013, provisional application No. 61/735,460, filed on Dec. 10, 2012, provisional application No. 61/640,979, filed on May 1, 2012, provisional application No. 61/604,376, filed on Feb. 28, 2012, provisional application No. 61/459,994, filed on Dec. 22, 2010, provisional application No. 61/796,863, filed on Nov. 21, 2012, provisional application No. 61/744,342, filed on Sep. 24, 2012, provisional application No. 61/519,664, filed on May 25, 2011, provisional application No. 61/465,810, filed on Mar. 24, 2011, provisional application No. 61/744,864, filed on Oct. 4, 2012, provisional application No. 61/403,814, filed on Sep. 22, 2010, provisional application No. 61/462,715, filed on Feb. 7, 2011, provisional application No. 61/277,214, filed on Sep. 22, 2009, provisional application No. 61/277,900, filed on Sep. 30, 2009, provisional application No. 61/278,767, filed on Oct. 9, 2009, provisional application No. 61/279,094, filed on Oct. 16, 2009, provisional application No. 61/281,160, filed on Nov. 13, 2009, provisional application No. 61/283,780, filed on Dec. 9, 2009, provisional application No. 61/284,385, filed on Dec. 17, 2009, provisional application No. 61/342,988, filed on Apr. 22, 2010, provisional application No. 61/404,147, filed on Sep. 27, 2010, provisional application No. 61/123,019, filed on Apr. 4, 2008.

(56) References Cited

U.S. PATENT DOCUMENTS

| | | | |
|---|---|---|---|
| 381,968 | A | 5/1888 | Tesla |
| 493,858 | A | 3/1893 | Edison |
| 675,323 | A | 5/1901 | Clark |
| 687,292 | A | 11/1901 | Armstrong |
| 996,933 | A | 7/1911 | Lindquist |
| 1,081,462 | A | 12/1913 | Patton |
| 1,171,351 | A | 2/1916 | Neuland |
| 1,236,234 | A | 8/1917 | Troje |
| 1,252,289 | A | 1/1918 | Murray, Jr. |
| 1,301,135 | A | 4/1919 | Karasick |
| 1,312,546 | A | 8/1919 | Karasick |
| 1,323,546 | A | 8/1919 | Karasick |
| 1,554,236 | A | 1/1920 | Simmons |
| 1,343,751 | A | 6/1920 | Simmons |
| 1,624,741 | A | 12/1926 | Leppke et al. |
| 1,784,256 | A | 12/1930 | Stout |
| 1,895,129 | A | 1/1933 | Jones |
| 2,048,161 | A | 7/1936 | Klaiber |
| 2,147,482 | A | 12/1936 | Butler |
| 2,186,074 | A | 1/1940 | Koller |
| 2,240,035 | A | 4/1941 | Catherall |
| 2,243,555 | A | 5/1941 | Faus |
| 2,269,149 | A | 1/1942 | Edgar |
| 2,327,748 | A | 8/1943 | Smith |
| 2,337,248 | A | 12/1943 | Koller |
| 2,337,249 | A | 12/1943 | Koller |
| 2,346,904 | A * | 4/1944 | Carlson ............... F16K 31/088 251/65 |
| 2,389,298 | A | 11/1945 | Ellis |

(56) References Cited

U.S. PATENT DOCUMENTS

| | | |
|---|---|---|
| 2,401,887 A | 6/1946 | Sheppard |
| 2,414,653 A | 1/1947 | Iokholder |
| 2,438,231 A | 3/1948 | Schultz |
| 2,471,634 A | 5/1949 | Vennice |
| 2,475,456 A | 7/1949 | Norlander |
| 2,508,305 A | 5/1950 | Teetor |
| 2,513,226 A | 6/1950 | Wylie |
| 2,514,927 A | 7/1950 | Bernhard |
| 2,520,828 A | 8/1950 | Bertschi |
| 2,565,624 A | 8/1951 | Phelon |
| 2,570,625 A | 10/1951 | Zimmerman et al. |
| 2,690,349 A | 9/1954 | Teetor |
| 2,694,164 A | 11/1954 | Geppelt |
| 2,964,613 A | 11/1954 | Williams |
| 2,701,158 A | 2/1955 | Schmitt |
| 2,722,627 A | 11/1955 | Cluwen et al. |
| 2,770,759 A | 11/1956 | Ahlgren |
| 2,792,194 A * | 5/1957 | Huck .................. F16K 1/12 251/65 |
| 2,837,366 A | 6/1958 | Loeb |
| 2,853,331 A | 9/1958 | Teetor |
| 2,888,291 A | 5/1959 | Scott et al. |
| 2,896,991 A | 7/1959 | Martin, Jr. |
| 2,932,545 A | 4/1960 | Foley |
| 2,935,352 A | 5/1960 | Heppner |
| 2,935,353 A | 5/1960 | Loeb |
| 2,936,437 A | 5/1960 | Fraser et al. |
| 2,962,318 A | 11/1960 | Teetor |
| 3,025,372 A * | 3/1962 | Benjetsky .......... H01F 7/0242 200/302.3 |
| 3,055,999 A | 9/1962 | Lucas |
| 3,089,986 A | 5/1963 | Gauthier |
| 3,102,314 A | 9/1963 | Alderfer |
| 3,134,404 A * | 5/1964 | Ziccardi ............ F16K 31/0682 137/625.31 |
| 3,151,902 A | 10/1964 | Ahlgren |
| 3,204,995 A | 9/1965 | Teetor |
| 3,208,296 A | 9/1965 | Baermann |
| 3,238,399 A | 3/1966 | Johanees et al. |
| 3,273,104 A | 9/1966 | Krol |
| 3,288,511 A | 11/1966 | Tavano |
| 3,301,091 A | 1/1967 | Reese |
| 3,351,368 A | 11/1967 | Sweet |
| 3,382,386 A | 5/1968 | Schlaeppi |
| 3,408,104 A | 10/1968 | Raynes |
| 3,414,309 A | 12/1968 | Tresemer |
| 3,425,729 A | 2/1969 | Bisbing |
| 3,468,576 A | 9/1969 | Beyer et al. |
| 3,474,366 A | 10/1969 | Barney |
| 3,500,090 A | 3/1970 | Baermann |
| 3,521,216 A | 7/1970 | Tolegian |
| 3,645,650 A | 2/1972 | Laing |
| 3,668,670 A | 6/1972 | Andersen |
| 3,684,992 A | 8/1972 | Huguet et al. |
| 3,690,393 A | 9/1972 | Guy |
| 3,696,258 A | 10/1972 | Anderson et al. |
| 3,790,197 A | 2/1974 | Parker |
| 3,791,309 A | 2/1974 | Baermann |
| 3,802,034 A | 4/1974 | Bookless |
| 3,803,433 A | 4/1974 | Ingenito |
| 3,808,577 A | 4/1974 | Mathauder |
| 3,836,801 A | 9/1974 | Yamashita et al. |
| 3,845,430 A | 10/1974 | Petkewicz et al. |
| 3,893,059 A | 7/1975 | Nowak |
| 3,976,316 A | 8/1976 | Laby |
| 4,079,558 A | 3/1978 | Gorham |
| 4,117,431 A | 9/1978 | Eicher |
| 4,129,846 A | 12/1978 | Yablochnikov |
| 4,209,905 A | 7/1980 | Gillings |
| 4,222,489 A | 9/1980 | Hutter |
| 4,296,394 A | 10/1981 | Ragheb |
| 4,327,892 A * | 5/1982 | Ruyak .................. F16K 31/088 251/129.03 |
| 4,340,833 A | 7/1982 | Sudo et al. |
| 4,352,960 A | 10/1982 | Dormer et al. |
| 4,355,236 A | 10/1982 | Holsinger |
| 4,399,595 A | 8/1983 | Yoon et al. |
| 4,416,127 A | 11/1983 | Gomez-Olea Naveda |
| 4,451,811 A | 5/1984 | Hoffman |
| 4,453,294 A | 6/1984 | Morita |
| 4,505,301 A * | 3/1985 | Yang .................... F16K 11/087 137/625.41 |
| 4,517,483 A | 5/1985 | Hucker et al. |
| 4,535,278 A | 8/1985 | Asakawa |
| 4,547,756 A | 10/1985 | Miller et al. |
| 4,629,131 A | 12/1986 | Podell |
| 4,645,283 A | 2/1987 | Macdonald et al. |
| 4,680,494 A | 7/1987 | Grosjean |
| 4,764,743 A | 8/1988 | Leupold et al. |
| 4,808,955 A | 2/1989 | Godkin et al. |
| 4,837,539 A | 6/1989 | Baker |
| 4,849,749 A | 7/1989 | Fukumachi et al. |
| 4,862,128 A | 8/1989 | Leupold |
| 4,893,103 A | 1/1990 | Leupold |
| 4,912,727 A | 3/1990 | Schubert |
| 4,941,236 A | 7/1990 | Sherman et al. |
| 4,956,625 A | 9/1990 | Cardone et al. |
| 4,980,593 A | 12/1990 | Edmundson |
| 4,993,950 A | 2/1991 | Mensor, Jr. |
| 4,994,778 A | 2/1991 | Leupold |
| 4,996,457 A | 2/1991 | Hawsey et al. |
| 5,013,949 A | 5/1991 | Mabe, Jr. |
| 5,020,625 A | 6/1991 | Yamauchi et al. |
| 5,050,276 A | 9/1991 | Pemberton |
| 5,062,855 A | 11/1991 | Rincoe |
| 5,123,843 A | 6/1992 | Van der Zel et al. |
| 5,179,307 A | 1/1993 | Porter |
| 5,190,325 A | 3/1993 | Doss-Desouza |
| 5,213,307 A | 5/1993 | Perrillat-Amede |
| 5,302,929 A | 4/1994 | Kovacs |
| 5,309,680 A | 5/1994 | Kiel |
| 5,345,207 A | 9/1994 | Gebele |
| 5,349,258 A | 9/1994 | Leupold et al. |
| 5,367,891 A | 11/1994 | Furuyama |
| 5,383,049 A | 1/1995 | Carr |
| 5,394,132 A | 2/1995 | Poil |
| 5,399,933 A | 3/1995 | Tsai |
| 5,425,763 A | 6/1995 | Stemmann |
| 5,440,997 A | 8/1995 | Crowley |
| 5,461,386 A | 10/1995 | Knebelkamp |
| 5,485,435 A | 1/1996 | Matsuda et al. |
| 5,492,572 A | 2/1996 | Schroeder et al. |
| 5,495,221 A | 2/1996 | Post |
| 5,512,732 A | 4/1996 | Yagnik et al. |
| 5,570,084 A | 10/1996 | Ritter et al. |
| 5,582,522 A | 12/1996 | Johnson |
| 5,604,960 A | 2/1997 | Good |
| 5,631,093 A | 5/1997 | Perry et al. |
| 5,631,618 A | 5/1997 | Trumper et al. |
| 5,633,555 A | 5/1997 | Ackermann et al. |
| 5,635,889 A | 6/1997 | Stelter |
| 5,637,972 A | 6/1997 | Randall et al. |
| 5,730,155 A | 3/1998 | Allen |
| 5,742,036 A | 4/1998 | Schramm, Jr. et al. |
| 5,759,054 A | 6/1998 | Spadafore |
| 5,788,493 A | 8/1998 | Tanaka et al. |
| 5,838,304 A | 11/1998 | Hall |
| 5,852,393 A | 12/1998 | Reznik et al. |
| 5,935,155 A | 8/1999 | Humayun et al. |
| 5,956,778 A | 9/1999 | Godoy |
| 5,983,406 A | 11/1999 | Meyerrose |
| 6,000,484 A | 12/1999 | Zoretich et al. |
| 6,039,759 A | 3/2000 | Carpentier et al. |
| 6,047,456 A | 4/2000 | Yao et al. |
| 6,072,251 A | 6/2000 | Markle |
| 6,074,420 A | 6/2000 | Eaton |
| 6,104,108 A | 8/2000 | Hazelton et al. |
| 6,115,849 A | 9/2000 | Meyerrose |
| 6,118,271 A | 9/2000 | Ely et al. |
| 6,120,283 A | 9/2000 | Cousins |
| 6,125,955 A | 10/2000 | Zoretich et al. |
| 6,142,779 A | 11/2000 | Siegel et al. |
| 6,170,131 B1 | 1/2001 | Shin |
| 6,187,041 B1 | 2/2001 | Garonzik |

(56) References Cited

U.S. PATENT DOCUMENTS

| | | |
|---|---|---|
| 6,188,147 B1 | 2/2001 | Hazelton et al. |
| 6,205,012 B1 | 3/2001 | Lear |
| 6,208,489 B1 | 3/2001 | Marchon |
| 6,210,033 B1 | 4/2001 | Karkos, Jr. et al. |
| 6,224,374 B1 | 5/2001 | Mayo |
| 6,234,374 B1 | 5/2001 | Hwang et al. |
| 6,241,069 B1 | 6/2001 | Mazur et al. |
| 6,273,918 B1 | 8/2001 | Yuhasz et al. |
| 6,275,778 B1 | 8/2001 | Shimada et al. |
| 6,285,097 B1 | 9/2001 | Hazelton et al. |
| 6,387,096 B1 | 5/2002 | Hyde, Jr. |
| 6,422,533 B1 | 7/2002 | Harms |
| 6,457,179 B1 | 10/2002 | Prendergast |
| 6,467,326 B1 | 10/2002 | Garrigus |
| 6,535,092 B1 | 3/2003 | Hurley et al. |
| 6,540,515 B1 | 4/2003 | Tanaka |
| 6,561,815 B1 | 5/2003 | Schmidt |
| 6,599,321 B2 | 7/2003 | Hyde, Jr. |
| 6,607,304 B1 | 8/2003 | Lake et al. |
| 6,652,278 B2 | 11/2003 | Honkura et al. |
| 6,653,919 B2 | 11/2003 | Shih-Chung et al. |
| 6,720,698 B2 | 4/2004 | Galbraith |
| 6,747,537 B1 | 6/2004 | Mosteller |
| 6,821,126 B2 | 11/2004 | Neidlein |
| 6,841,910 B2 | 1/2005 | Gery |
| 6,842,332 B1 | 1/2005 | Rubenson et al. |
| 6,847,134 B2 | 1/2005 | Frissen et al. |
| 6,850,139 B1 | 2/2005 | Dettmann et al. |
| 6,862,748 B2 | 3/2005 | Prendergast |
| 6,864,773 B2 | 3/2005 | Perrin |
| 6,913,471 B2 | 7/2005 | Smith |
| 6,927,657 B1 | 8/2005 | Wu |
| 6,936,937 B2 | 8/2005 | Tu et al. |
| 6,954,968 B1 | 10/2005 | Sitbon |
| 6,971,147 B2 | 12/2005 | Halstead |
| 7,004,446 B2 * | 2/2006 | Petro .................. F16K 31/086 251/63.4 |
| 7,009,874 B2 | 3/2006 | Deak |
| 7,016,492 B2 | 3/2006 | Pan et al. |
| 7,031,160 B2 | 4/2006 | Tillotson |
| 7,033,400 B2 | 4/2006 | Currier |
| 7,038,565 B1 | 5/2006 | Chell |
| 7,065,860 B2 | 6/2006 | Aoki et al. |
| 7,066,739 B2 | 6/2006 | Mcleish |
| 7,066,778 B2 | 6/2006 | Kretzschmar |
| 7,097,461 B2 | 8/2006 | Neidlein |
| 7,101,374 B2 | 9/2006 | Hyde, Jr. |
| 7,135,792 B2 | 11/2006 | Devaney et al. |
| 7,137,727 B2 | 11/2006 | Joseph et al. |
| 7,186,265 B2 | 3/2007 | Sharkawy et al. |
| 7,224,252 B2 | 5/2007 | Meadow, Jr. et al. |
| 7,264,479 B1 | 9/2007 | Lee |
| 7,276,025 B2 | 10/2007 | Roberts et al. |
| 7,311,526 B2 | 12/2007 | Rohrbach et al. |
| 7,324,320 B2 | 1/2008 | Maurer et al. |
| 7,339,790 B2 | 3/2008 | Baker et al. |
| 7,344,380 B2 | 3/2008 | Neidlein et al. |
| 7,351,066 B2 | 4/2008 | DiFonzo et al. |
| 7,358,724 B2 | 4/2008 | Taylor et al. |
| 7,362,018 B1 | 4/2008 | Kulogo et al. |
| 7,364,433 B2 | 4/2008 | Neidlein |
| 7,381,181 B2 | 6/2008 | Lau et al. |
| 7,402,175 B2 | 7/2008 | Azar |
| 7,416,414 B2 | 8/2008 | Bozzone et al. |
| 7,438,726 B2 | 10/2008 | Erb |
| 7,444,683 B2 | 11/2008 | Prendergast et al. |
| 7,453,341 B1 | 11/2008 | Hildenbrand |
| 7,467,948 B2 | 12/2008 | Lindberg et al. |
| 7,498,914 B2 | 3/2009 | Miyashita et al. |
| 7,583,500 B2 | 9/2009 | Ligtenberg et al. |
| 7,637,746 B2 | 12/2009 | Lindberg et al. |
| 7,645,143 B2 | 1/2010 | Rohrbach et al. |
| 7,658,613 B1 | 2/2010 | Griffin et al. |
| 7,715,890 B2 | 5/2010 | Kim et al. |
| 7,717,396 B2 * | 5/2010 | Graffin .................. H01F 7/0242 251/65 |
| 7,750,524 B2 | 7/2010 | Sugimoto et al. |
| 7,762,817 B2 | 7/2010 | Ligtenberg et al. |
| 7,775,567 B2 | 8/2010 | Ligtenberg et al. |
| 7,796,002 B2 | 9/2010 | Hashimoto et al. |
| 7,799,281 B2 | 9/2010 | Cook et al. |
| 7,808,349 B2 | 10/2010 | Fullerton et al. |
| 7,812,697 B2 | 10/2010 | Fullerton et al. |
| 7,817,004 B2 | 10/2010 | Fullerton et al. |
| 7,828,556 B2 | 11/2010 | Rodrigues |
| 7,832,897 B2 | 11/2010 | Ku |
| 7,837,032 B2 | 11/2010 | Smeltzer |
| 7,839,246 B2 | 11/2010 | Fullerton et al. |
| 7,843,297 B2 | 11/2010 | Fullerton et al. |
| 7,868,721 B2 | 1/2011 | Fullerton et al. |
| 7,871,272 B2 | 1/2011 | Firman, II et al. |
| 7,874,856 B1 | 1/2011 | Schriefer et al. |
| 7,889,037 B2 | 2/2011 | Cho |
| 7,901,216 B2 | 3/2011 | Rohrbach et al. |
| 7,903,397 B2 | 3/2011 | McCoy |
| 7,905,626 B2 | 3/2011 | Shantha et al. |
| 7,997,906 B2 | 8/2011 | Ligtenberg et al. |
| 8,002,585 B2 | 8/2011 | Zhou |
| 8,009,001 B1 | 8/2011 | Cleveland |
| 8,050,714 B2 | 11/2011 | Fadell et al. |
| 8,078,224 B2 | 12/2011 | Fadell et al. |
| 8,078,776 B2 | 12/2011 | Novotney et al. |
| 8,087,939 B2 | 1/2012 | Rohrbach et al. |
| 8,099,964 B2 | 1/2012 | Saito et al. |
| 8,138,869 B1 | 3/2012 | Lauder et al. |
| 8,143,982 B1 | 3/2012 | Lauder et al. |
| 8,143,983 B1 | 3/2012 | Lauder et al. |
| 8,165,634 B2 | 4/2012 | Fadell et al. |
| 8,177,560 B2 | 5/2012 | Rohrbach et al. |
| 8,187,006 B2 | 5/2012 | Rudisill et al. |
| 8,190,205 B2 | 5/2012 | Fadell et al. |
| 8,242,868 B2 | 8/2012 | Lauder et al. |
| 8,253,518 B2 | 8/2012 | Lauder et al. |
| 8,264,310 B2 | 9/2012 | Lauder et al. |
| 8,264,314 B2 | 9/2012 | Sankar |
| 8,271,038 B2 | 9/2012 | Fadell et al. |
| 8,271,705 B2 | 9/2012 | Novotney et al. |
| 8,297,367 B2 | 10/2012 | Chen et al. |
| 8,344,836 B2 | 1/2013 | Lauder et al. |
| 8,348,678 B2 | 1/2013 | Hardisty et al. |
| 8,354,767 B2 | 1/2013 | Pennander et al. |
| 8,390,411 B2 | 3/2013 | Lauder et al. |
| 8,390,412 B2 | 3/2013 | Lauder et al. |
| 8,390,413 B2 | 3/2013 | Lauder et al. |
| 8,395,465 B2 | 3/2013 | Lauder et al. |
| 8,398,409 B2 | 3/2013 | Schmidt |
| 8,435,042 B2 | 5/2013 | Rohrbach et al. |
| 8,454,372 B2 | 6/2013 | Lee |
| 8,467,829 B2 | 6/2013 | Fadell et al. |
| 8,497,753 B2 | 7/2013 | DiFonzo et al. |
| 8,514,042 B2 | 8/2013 | Lauder et al. |
| 8,535,088 B2 | 9/2013 | Gao et al. |
| 8,576,031 B2 | 11/2013 | Lauder et al. |
| 8,576,034 B2 | 11/2013 | Bilbrey et al. |
| 8,616,362 B1 | 12/2013 | Browne et al. |
| 8,648,679 B2 | 2/2014 | Lauder et al. |
| 8,665,044 B2 | 3/2014 | Lauder et al. |
| 8,665,045 B2 | 3/2014 | Lauder et al. |
| 8,690,582 B2 | 4/2014 | Rohrbach et al. |
| 8,702,316 B2 | 4/2014 | DiFonzo et al. |
| 8,734,024 B2 | 5/2014 | Isenhour et al. |
| 8,752,200 B2 | 6/2014 | Varshavsky et al. |
| 8,757,893 B1 | 6/2014 | Isenhour et al. |
| 8,770,857 B2 | 7/2014 | DiFonzo et al. |
| 8,774,577 B2 | 7/2014 | Benjamin et al. |
| 8,781,273 B2 | 7/2014 | Benjamin et al. |
| 2002/0125977 A1 | 9/2002 | VanZoest |
| 2003/0136837 A1 | 7/2003 | Amon et al. |
| 2003/0170976 A1 | 9/2003 | Molla et al. |
| 2003/0179880 A1 | 9/2003 | Pan et al. |
| 2003/0187510 A1 | 10/2003 | Hyde |
| 2004/0003487 A1 | 1/2004 | Reiter |
| 2004/0244636 A1 | 12/2004 | Meadow et al. |

(56) References Cited

U.S. PATENT DOCUMENTS

| | | |
|---|---|---|
| 2004/0251759 A1 | 12/2004 | Hirzel |
| 2005/0102802 A1 | 5/2005 | Sitbon et al. |
| 2005/0196484 A1 | 9/2005 | Khoshnevis |
| 2005/0231046 A1 | 10/2005 | Aoshima |
| 2005/0240263 A1 | 10/2005 | Fogarty et al. |
| 2005/0263549 A1 | 12/2005 | Scheiner |
| 2005/0283839 A1 | 12/2005 | Cowburn |
| 2006/0066428 A1 | 3/2006 | McCarthy et al. |
| 2006/0189259 A1 | 8/2006 | Park et al. |
| 2006/0198047 A1 | 9/2006 | Xue et al. |
| 2006/0198998 A1 | 9/2006 | Raksha et al. |
| 2006/0214756 A1 | 9/2006 | Elliott et al. |
| 2006/0290451 A1 | 12/2006 | Prendergast et al. |
| 2006/0293762 A1 | 12/2006 | Schulman et al. |
| 2007/0072476 A1 | 3/2007 | Milan |
| 2007/0075594 A1 | 4/2007 | Sadler |
| 2007/0103266 A1 | 5/2007 | Wang et al. |
| 2007/0138806 A1 | 6/2007 | Ligtenberg et al. |
| 2007/0255400 A1 | 11/2007 | Parravicini et al. |
| 2007/0267929 A1 | 11/2007 | Pulnikov et al. |
| 2008/0119250 A1 | 5/2008 | Cho et al. |
| 2008/0139261 A1 | 6/2008 | Cho et al. |
| 2008/0174392 A1 | 7/2008 | Cho |
| 2008/0181804 A1 | 7/2008 | Tanigawa et al. |
| 2008/0186683 A1 | 8/2008 | Ligtenberg et al. |
| 2008/0218299 A1 | 9/2008 | Arnold |
| 2008/0224806 A1 | 9/2008 | Ogden et al. |
| 2008/0272868 A1 | 11/2008 | Prendergast et al. |
| 2008/0282517 A1 | 11/2008 | Claro |
| 2009/0021333 A1 | 1/2009 | Fiedler |
| 2009/0209173 A1 | 8/2009 | Arledge et al. |
| 2009/0250576 A1 | 10/2009 | Fullerton et al. |
| 2009/0251256 A1 | 10/2009 | Fullerton et al. |
| 2009/0254196 A1 | 10/2009 | Cox et al. |
| 2009/0278642 A1 | 11/2009 | Fullerton et al. |
| 2009/0289090 A1 | 11/2009 | Fullerton et al. |
| 2009/0289749 A1 | 11/2009 | Fullerton et al. |
| 2009/0292371 A1 | 11/2009 | Fullerton et al. |
| 2010/0033280 A1 | 2/2010 | Bird et al. |
| 2010/0126857 A1 | 5/2010 | Polwart et al. |
| 2010/0134916 A1 | 6/2010 | Kawabe |
| 2010/0167576 A1 | 7/2010 | Zhou |
| 2011/0026203 A1 | 2/2011 | Ligtenberg et al. |
| 2011/0051288 A1 | 3/2011 | Contreras |
| 2011/0085157 A1 | 4/2011 | Bloss et al. |
| 2011/0101088 A1 | 5/2011 | Marguerettaz et al. |
| 2011/0210636 A1 | 9/2011 | Kuhlmann-Wilsdorf |
| 2011/0234344 A1 | 9/2011 | Fullerton et al. |
| 2011/0248806 A1 | 10/2011 | Michael |
| 2011/0279206 A1 | 11/2011 | Fullerton et al. |
| 2012/0007704 A1 | 1/2012 | Nerl |
| 2012/0064309 A1 | 3/2012 | Kwon et al. |
| 2012/0085753 A1 | 4/2012 | Fitch et al. |
| 2012/0235519 A1 | 9/2012 | Dyer et al. |
| 2013/0001745 A1 | 1/2013 | Iwaki |
| 2013/0186209 A1 | 7/2013 | Herbst |
| 2013/0186473 A1 | 7/2013 | Mankame et al. |
| 2013/0186807 A1 | 7/2013 | Browne et al. |
| 2013/0187638 A1 | 7/2013 | Herbst |
| 2013/0192860 A1 | 8/2013 | Puzio et al. |
| 2013/0207758 A1 | 8/2013 | Browne et al. |
| 2013/0252375 A1 | 9/2013 | Yi et al. |
| 2013/0256274 A1 | 10/2013 | Faulkner |
| 2013/0270056 A1 | 10/2013 | Mankame et al. |
| 2013/0305705 A1 | 11/2013 | Ac et al. |
| 2013/0341137 A1 | 12/2013 | Mankame et al. |
| 2014/0044972 A1 | 2/2014 | Menassa et al. |
| 2014/0072261 A1 | 3/2014 | Isenhour et al. |
| 2014/0152252 A1 | 6/2014 | Wood et al. |
| 2014/0205235 A1 | 7/2014 | Benjamin et al. |
| 2014/0221741 A1 | 8/2014 | Wang et al. |

FOREIGN PATENT DOCUMENTS

| | | |
|---|---|---|
| EP | 0345554 | 12/1989 |
| EP | 0545737 A1 | 6/1993 |
| FR | 823395 A | 1/1938 |
| GB | 1495677 A | 12/1977 |
| JP | 54-152200 | 11/1979 |
| JP | S57-55908 A | 4/1982 |
| JP | S57-189423 A | 12/1982 |
| JP | 60091011 U | 5/1985 |
| JP | 60-221238 A | 11/1985 |
| JP | 64-30444 A | 2/1989 |
| JP | 2001-328483 A | 11/2001 |
| JP | 2008035676 A | 2/2008 |
| JP | 2008165974 A | 7/2008 |
| JP | 05-038123 B2 | 10/2012 |
| WO | 02/31945 A2 | 4/2002 |
| WO | 2007/081830 A2 | 7/2007 |
| WO | 2009/124030 A1 | 10/2009 |
| WO | 2010/141324 A1 | 12/2010 |

OTHER PUBLICATIONS

Atallah, K., Howe, D. 2001, "A Novel High-Performance Magnetic Gear", IEEE Transactions on Magnetics, vol. 37, No. 4, Jul. 2001, p. 2844-46.

Bassani, R., 2007, "Dynamic Stability of Passive Magnetic Bearings", Nonlinear Dynamics, V. 50, p. 161-68.

"BNS 33 Range, Magnetic safety sensors, Rectangular design, http://www.farnell.com/datasheets/36449.pdf, 3 pages, date unknown."

"Boston Gear 221S-4, One-stage Helical Gearbox, http://www.bostongearcom/pdf/product_sections/200_series_helical.pdf, referenced Jun. 2010".

Charpentier et al., 2001, "Mechanical Behavior of Axially Magnetized Permanent-Magnet Gears", IEEE Transactions on Magnetics, vol. 37, No. 3, May 2001, p. 1110-17.

Chau et al., 2008, "Transient Analysis of Coaxial Magnetic Gears Using Finite Element Comodeling", Journal of Applied Physics, vol. 103.

Choi et al., 2010, "Optimization of Magnetization Directions in a 3-D Magnetic Structure", IEEE Transactions on Magnetics, vol. 46, No. 6, Jun. 2010, p. 1603-06.

Correlated Magnetics Research, 2009, Online Video, "Innovative Magnetics Research in Huntsville", http://www.youtube.com/watch?v=m4m81JjZCJo.

Correlated Magnetics Research, 2009, Online Video, "Non-Contact Attachment Utilizing Permanent Magnets", http://www.youtube.com/watch?v=3xUm25CNNgQ.

"Correlated Magnetics Research, 2010, Company Website, http://www.correlatedmagnetics.com".

Furlani 1996, "Analysis and optimization of synchronous magnetic couplings", J. Appl. Phys., vol. 79, No. 8, p. 4692.

Furlani 2001, "Permanent Magnet and Electromechanical Devices", Academic Press, San Diego.

Furlani, E.P., 2000, "Analytical analysis of magnetically coupled multipole cylinders", J. Phys. D: Appl. Phys., vol. 33, No. 1, p. 28-33.

General Electric DP 2.7 Wind Turbine Gearbox, http://www.gedrivetrain.com/insideDP27.cfm, referenced Jun. 2010.

Ha et al., 2002, "Design and Characteristic Analysis of Non-Contact Magnet Gear for Conveyor by Using Permanent Magnet", Conf. Record of the 2002 IEEE Industry Applications Conference, p. 1922-27.

Huang et al., 2008, "Development of a Magnetic Planetary Gearbox", IEEE Transactions on Magnetics, vol. 44, No. 3, p. 403-12.

International Search Report and Written Opinion dated Jun. 1, 2009, directed to counterpart application No. PCT/US2009/002027. (10 pages).

International Search Report and Written Opinion of the International Searching Authority issued in Application No. PCT/US12/61938 dated Feb. 26, 2013.

International Search Report and Written Opinion of the International Searching Authority issued in Application No. PCT/US2013/028095 dated May 13, 2013.

(56) References Cited

OTHER PUBLICATIONS

International Search Report and Written Opinion of the International Searching Authority issued in Application No. PCT/US2013/047986 dated Nov. 21, 2013.
International Search Report and Written Opinion, dated Apr. 8, 2011 issued in related International Application No. PCT/US2010/049410.
International Search Report and Written Opinion, dated Aug. 18, 2010, issued in related International Application No. PCT/US2010/036443.
International Search Report and Written Opinion, dated Jul. 13, 2010, issued in related International Application No. PCT/US2010/021612.
International Search Report and Written Opinion, dated May 14, 2009, issued in related International Application No. PCT/US2009/038925.
Jian et al., "Comparison of Coaxial Magnetic Gears With Different Topologies", IEEE Transactions on Magnetics, vol. 45, No. 10, Oct. 2009, p. 4526-29.
Jian, L., Chau, K.T., 2010, "A Coaxial Magnetic Gear With Halbach Permanent-Magnet Arrays", IEEE Transactions on Energy Conversion, vol. 25, No. 2, Jun. 2010, p. 319-28.
Jorgensen et al., "The Cycloid Permanent Magnetic Gear", IEEE Transactions on Industry Applications, vol. 44, No. 6, Nov./Dec. 2008, p. 1659-65.
Jorgensen et al., 2005, "Two dimensional model of a permanent magnet spur gear", Conf. Record of the 2005 IEEE Industry Applications Conference, p. 261-5.
Kim, "A future cost trends of magnetizer systems in Korea", Industrial Electronics, Control, and Instrumentation, 1996, vol. 2, Aug. 5, 1996, pp. 991-996.
Krasil'nikov et al., 2008, "Calculation of the Shear Force of Highly Coercive Permanent Magnets in Magnetic Systems With Consideration of Affiliation to a Certain Group Based on Residual Induction", Chemical and Petroleum Engineering, vol. 44, Nos. 7-8, p. 362-65.
Krasil'nikov et al., 2009, "Torque Determination for a Cylindrical Magnetic Clutch", Russian Engineering Research, vol. 29, No. 6, pp. 544-547.
Liu et al., 2009, "Design and Analysis of Interior-magnet Outer-rotor Concentric Magnetic Gears", Journal of Applied Physics, vol. 105.
Lorimer, W., Hartman, A., 1997, "Magnetization Pattern for Increased Coupling in Magnetic Clutches", IEEE Transactions on Magnetics, vol. 33, No. 5, Sep. 1997.
Mezani, S., Atallah, K., Howe, D. , 2006, "A high-performance axial-field magnetic gear", Journal of Applied Physics vol. 99.
Mi, "Magnetreater/Charger Model 580" Magnetic Instruments Inc. Product specification, May 4, 2009, http://web.archive.org/web/20090504064511/http://www.maginst.com/specifications/580_mag netreater.htm, 2 pages.
Neugart PLE-160, One-Stage Planetary Gearbox, http://www.neugartusa.com/ple_160_gb.pdf, referenced Jun. 2010.
"Series BNS, Compatible Series AES Safety Controllers, http://www.schmersalusa.com/safety_controllers/drawingskes.Pdf, pp. 159-175, date unknown."
Series BNS-B20, Coded-Magnet Sensor Safety Door Handle, http://www.schmersalusa.com/catalog_pdfs/BNS_B20.pdf, 2pages, date unknown.
Series BNS333, Coded-Magnet Sensors with Integral Safety Control Module, http://www.schmersalusa.com/machine_guarding/coded_magnet/drawings/bns333.pdf, 2 pages, date unknown.
Tsurumoto 1992, "Basic Analysis on Transmitted Force of Magnetic Gear Using Permanent Magnet", IEEE Translation Journal on Magnetics in Japan, Vo 7, No. 6, Jun. 1992, p. 447-52.
United States Office Action issued in U.S. Appl. No. 13/104,393 dated Apr. 4, 2013.
United States Office Action issued in U.S. Appl. No. 13/236,413 dated Jun. 6, 2013.
United States Office Action issued in U.S. Appl. No. 13/246,584 dated May 16, 2013.
United States Office Action issued in U.S. Appl. No. 13/246,584 dated Oct. 15, 2013.
United States Office Action issued in U.S. Appl. No. 13/374,074 dated Feb. 21, 2013.
United States Office Action issued in U.S. Appl. No. 13/430,219 dated Aug. 13, 2013.
United States Office Action issued in U.S. Appl. No. 13/470,994 dated Aug. 8, 2013.
United States Office Action issued in U.S. Appl. No. 13/470,994 dated Jan. 7, 2013.
United States Office Action issued in U.S. Appl. No. 13/470,994 dated Nov. 8, 2013.
United States Office Action issued in U.S. Appl. No. 13/529,520 dated Sep. 28, 2012.
United States Office Action issued in U.S. Appl. No. 13/530,893 dated Mar. 22, 2013.
United States Office Action issued in U.S. Appl. No. 13/530,893 dated Oct. 29, 2013.
United States Office Action issued in U.S. Appl. No. 13/718,839 dated Dec. 16, 2013.
United States Office Action issued in U.S. Appl. No. 13/855,519 dated Jul. 17, 2013.
United States Office Action issued in U.S. Appl. No. 13/928,126 dated Oct. 11, 2013.
United States Office Action, dated Aug. 26, 2011, issued in courtpart U.S. Appl. No. 12/206,270.
United States Office Action, dated Feb. 2, 2011, issued in counterpart U.S. Appl. No. 12/476,952.
United States Office Action, dated Mar. 12, 2012, issued in counterpart U.S. Appl. No. 12/206,270.
United States Office Action, dated Mar. 9, 2012, issued in counterpart U.S. Appl. No. 13/371,280.
United States Office Action, dated Oct. 12, 2011, issued in counterpart U.S. Appl. No. 12/476,952.
Wikipedia, "Barker Code", Web article, last modified Aug. 2, 2008, 2 pages.
Wikipedia, "Bitter Electromagnet", Web article, last modified Aug. 2011, 1 page.
Wikipedia, "Costas Array", Web article, last modified Oct. 7, 2008, 4 pages.
Wikipedia, "Gold Code", Web article, last modified Jul. 27, 2008, 1 page.
Wikipedia, "Golomb Ruler", Web article, last modified Nov. 4, 2008, 3 pages.
Wikipedia, "Kasami Code", Web article, last modified Jun. 11, 2008, 1 page.
Wikipedia, "Linear feedback shift register", Web article, last modified Nov. 11, 2008, 6 pages.
Wikipedia, "Walsh Code", Web article, last modified Sep. 17, 2008, 2 pages.

\* cited by examiner

1 – aerator
2 – aerator wrench
3 – spray head
4 – handle
5 – cap
6 – bonnet nut
7 – valve cartridge

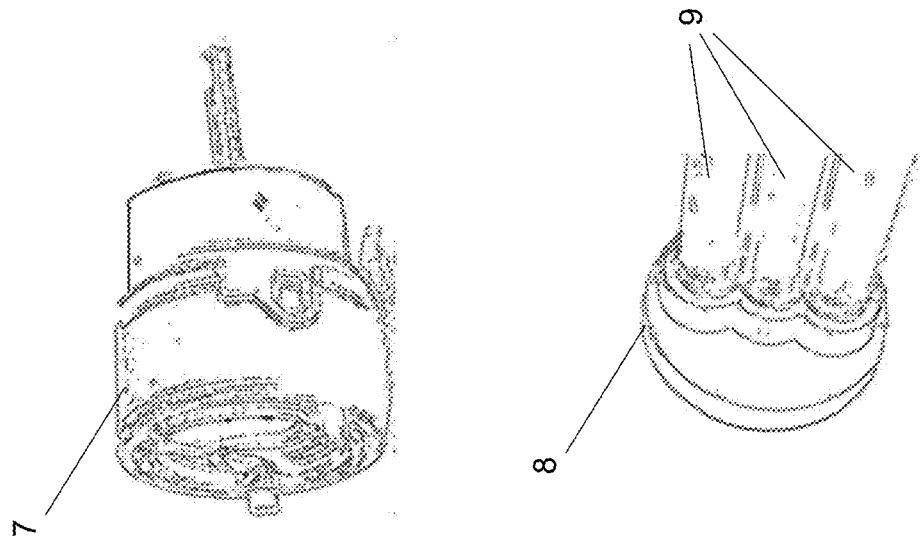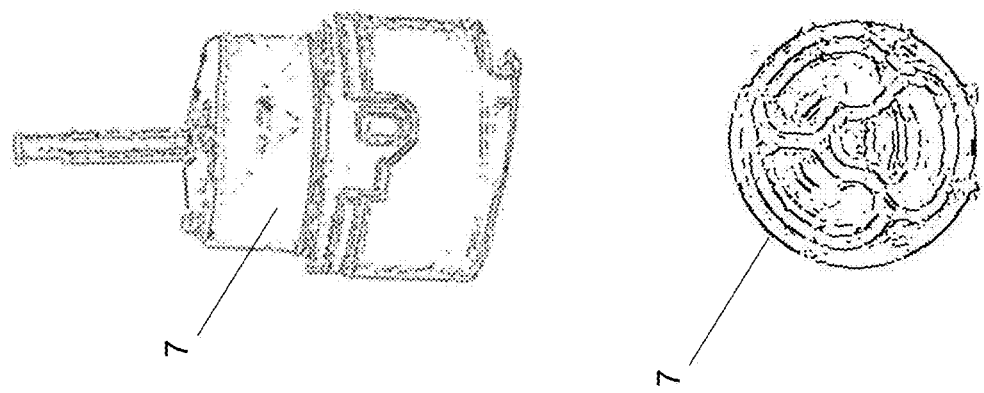
FIG. 1B (Prior Art)

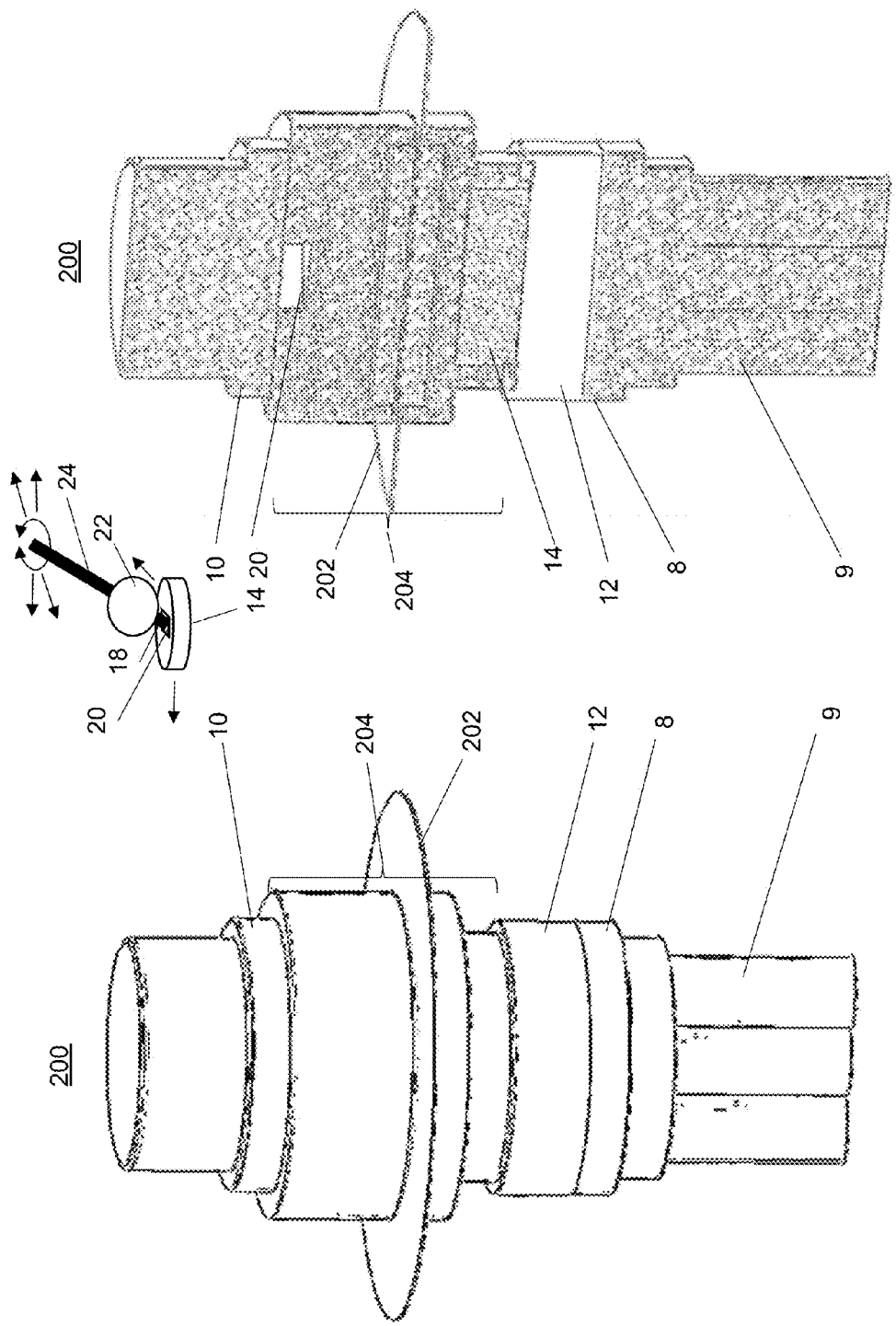

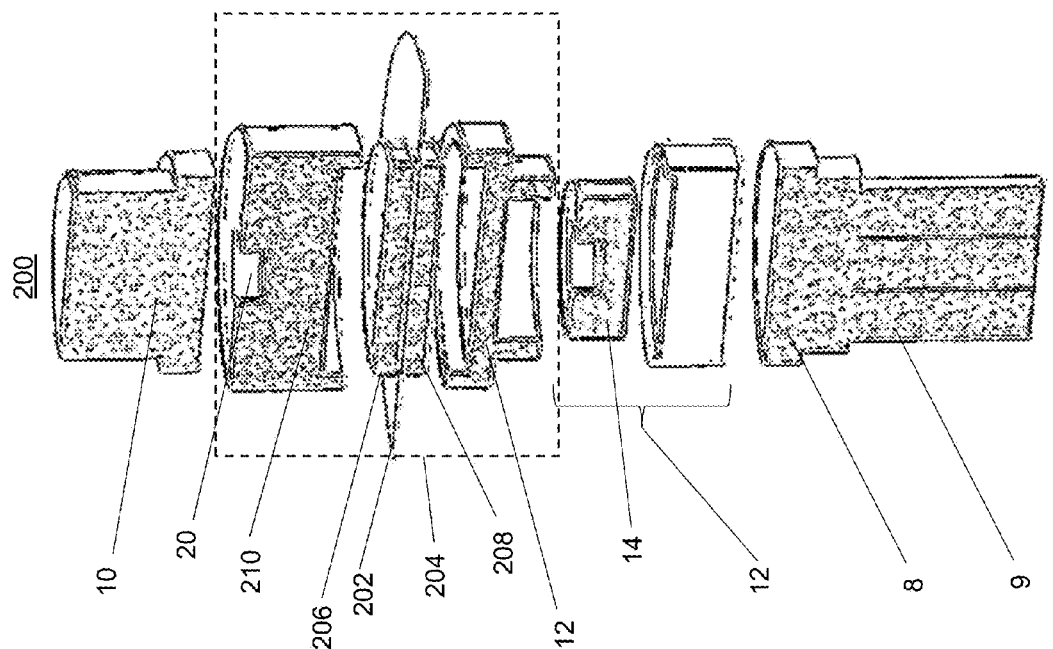
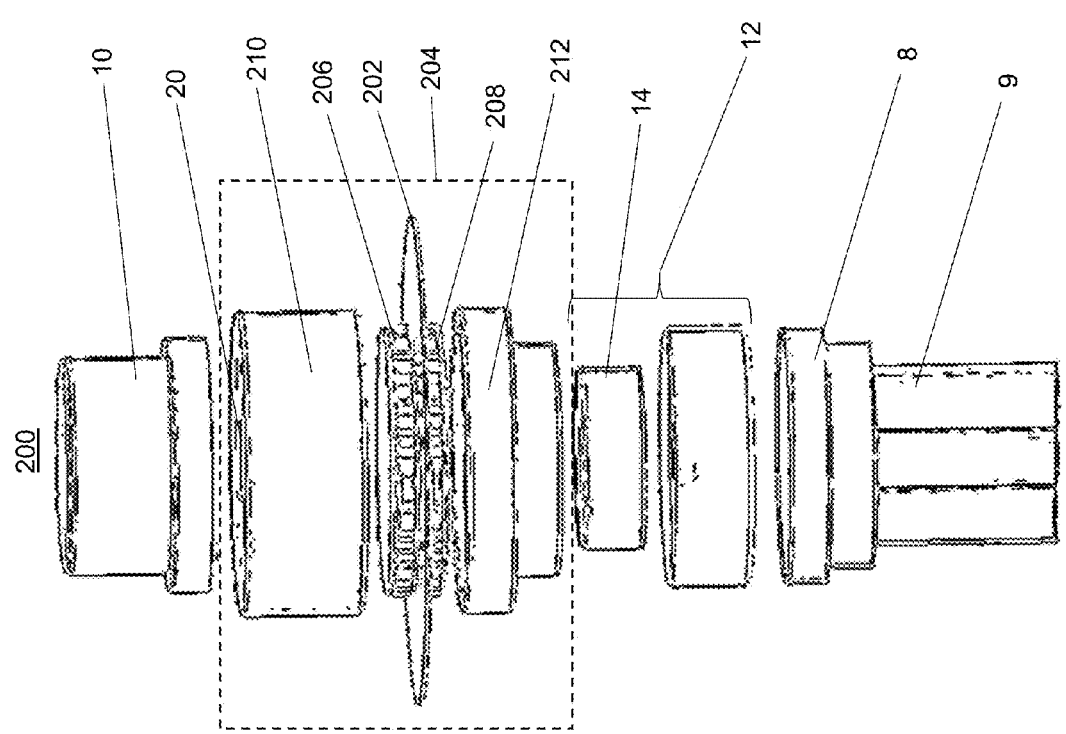

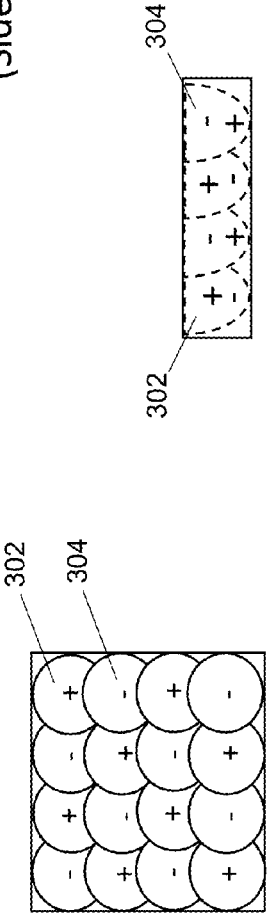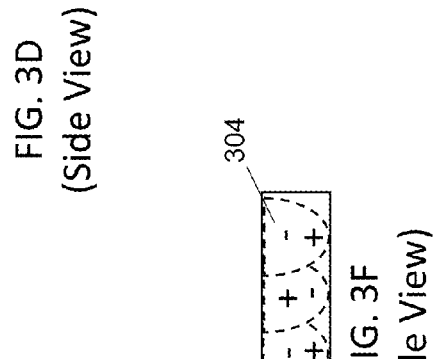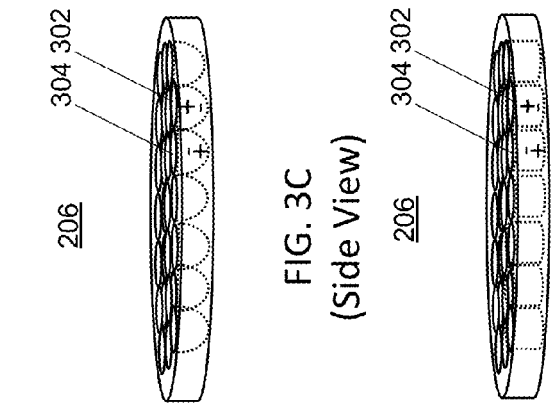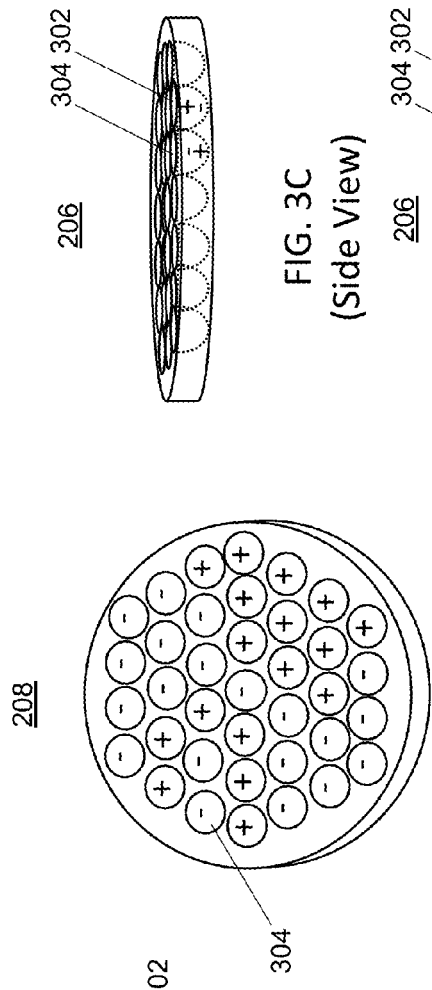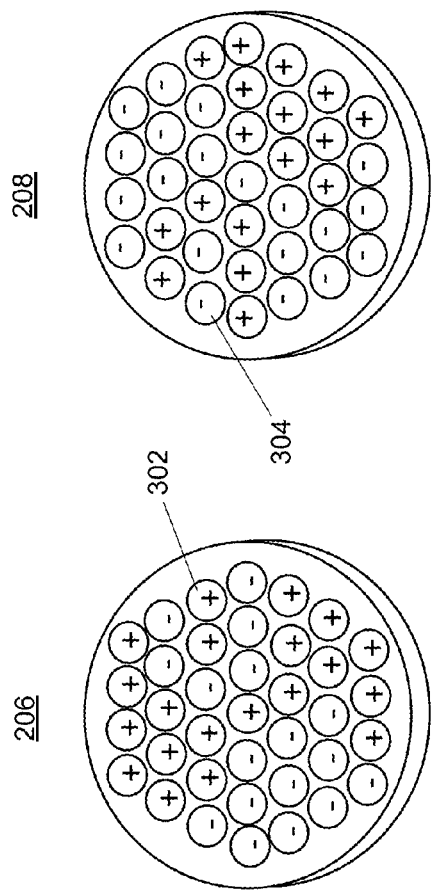

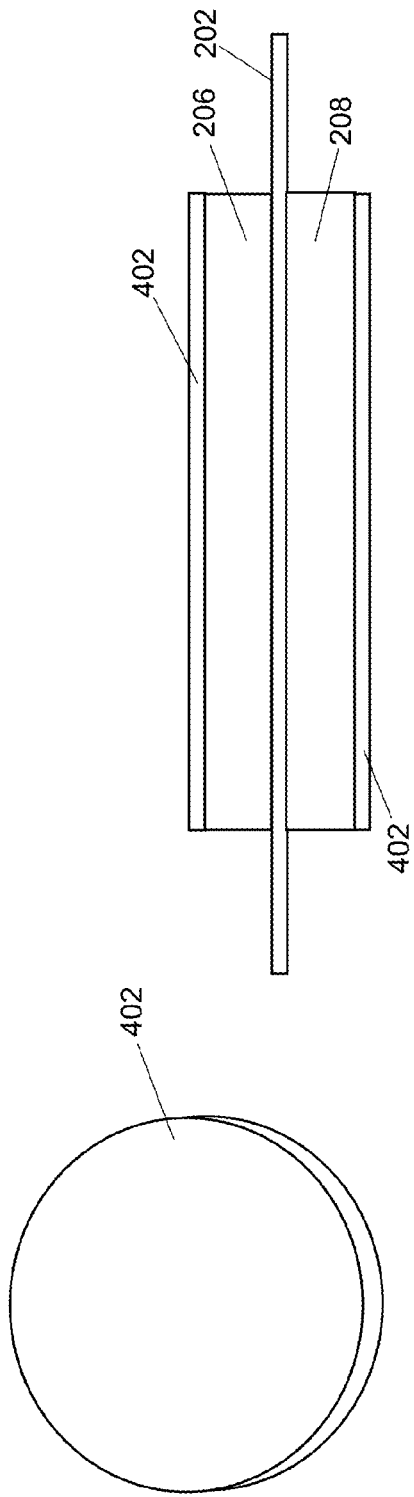
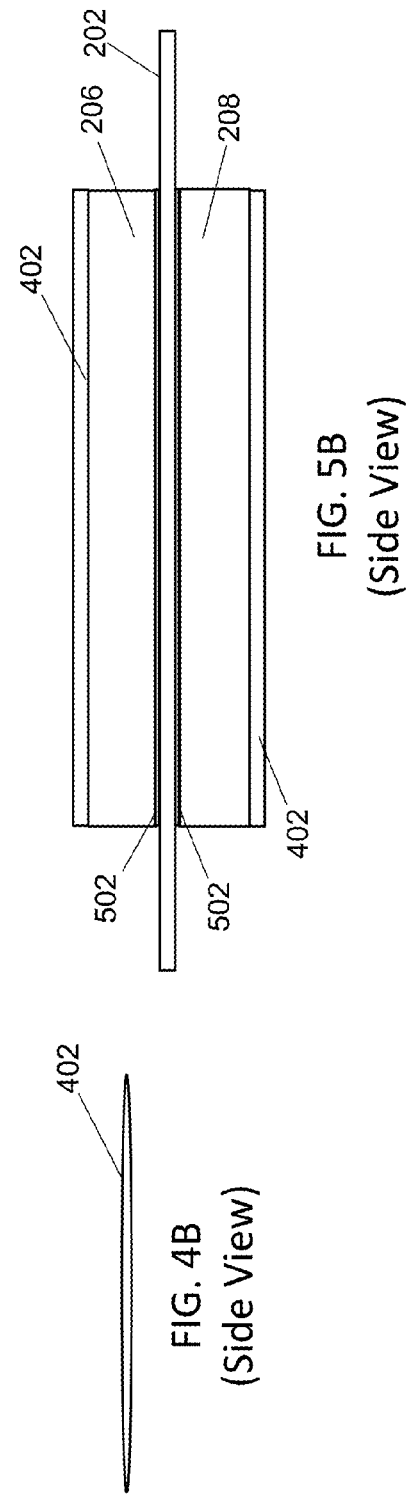

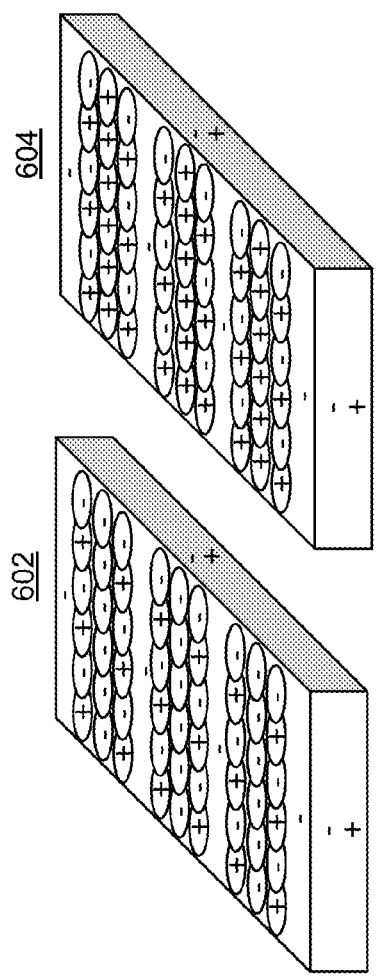
FIG. 6B (Top Side)
FIG. 6A (Bottom Side)
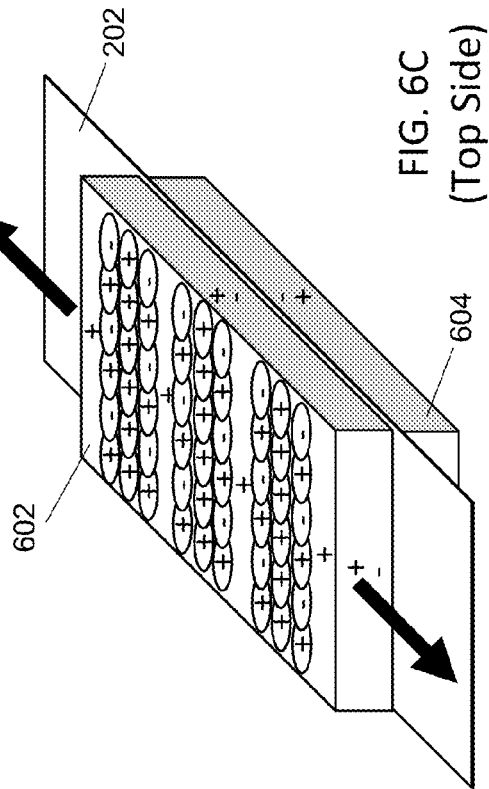
FIG. 6C (Top Side)

MAGNETIC VALVE ASSEMBLY

RELATED APPLICATIONS

This application claims the benefit under 35 USC 119(e) of provisional application 61/871,689, titled "Magnetic Valve Assembly", filed Aug. 29, 2013 by Fullerton et al.

This application is a continuation-in-part of non-provisional application Ser. No. 14/198,226, titled "Correlated Magnetic System and Method", filed Mar. 5, 2014 by Fullerton et al., which claims the benefit under 35 USC 119(e) of provisional applications 61/794,427, titled "Method for Correcting Bias in Correlated Field Emission Structures", filed Mar. 15, 2013 by Fullerton et al., 61/798,233, titled "Method for Using Symbols in Coded Field Emission Structures", filed Mar. 15, 2013 by Roberts et al., 61/798,453, titled "Apparatus and Method for Mechanical Augmentation of Correlated Field Emission Structures", filed Mar. 15, 2013 by Fullerton, 61/799,507, titled "Apparatus and Method for Constraining Field Emission Structures", filed Mar. 15, 2013 by Fullerton et al, and 61/800,377, titled "Method for Making and Using Composite Coded Field Emission Structures", filed Mar. 15, 2013 by Roberts et al.

Non-provisional application Ser. No. 14/198,226 is a continuation-in-part of non-provisional application Ser. No. 14/103,760, titled "An Intelligent Magnetic System", filed Dec. 11, 2013 by Fullerton et al., which claims the benefit under 35 USC 119(e) of provisional application 61/735,460, titled "An Intelligent Magnetic System", filed Dec. 10, 2012 by Fullerton et al.

Non-provisional application Ser. No. 14/103,760 is a continuation-in-part of non-provisional application Ser. No. 13/779,611, titled "System for Detaching a Magnetic Structure from a Ferromagnetic Material", filed Feb. 27, 2013 by Fullerton et al., which claims the benefit under 35 USC 119(e) of provisional application 61/640,979, titled "System for Detaching a Magnetic Structure from a Ferromagnetic Material", filed May 1, 2012 by Fullerton et al. and provisional application 61/604,376, titled "System for Detaching a Magnetic Structure from a Ferromagnetic Material", filed Feb. 28, 2012 by Fullerton et al.

Non-provisional application Ser. No. 14/103,760 is also a continuation-in-part of non-provisional application Ser. No. 14/066,426, titled "System and Method for Affecting Flux of Magnetic Structures", filed Oct. 29, 2013 by Fullerton et al., which is a continuation of U.S. Pat. No. 8,576,036, issued Nov. 5, 2013, which claims the benefit under 35 USC 119(e) of provisional application 61/459,994, titled "System and Method for Affecting Flux of Magnetic Structures", filed Dec. 22, 2010 by Fullerton et al.

Non-provisional application Ser. No. 14/103,760 is also a continuation-in-part of non-provisional application Ser. No. 14/086,924, titled "System and Method for Positioning a Multi-Pole Magnetic Structure" filed Nov. 21, 2013 by Fullerton et al. which claims the benefit under 35 USC 119(e) of provisional application 61/796,863, titled "System for Determining a Position of a Multi-pole Magnetic Structure", filed Nov. 21, 2012 by Fullerton et al.

Non-provisional application Ser. No. 14/086,924 is a continuation-in-part of non-provisional application Ser. No. 14/035,818, titled "Magnetic Structures and Methods for Defining Magnetic Structures Using One-Dimensional Codes" filed Sep. 24, 2013 by Fullerton et al, which claims the benefit under 35 USC 119(e) of provisional application 61/744,342, titled "Magnetic Structures and Methods for Defining Magnetic Structures Using One-Dimensional Codes", filed Sep. 24, 2012 by Roberts.

Non-provisional application Ser. No. 14/035,818 is a continuation-in-part of non-provisional application Ser. No. 13/959,649, titled "Magnetic Device Using Non Polarized Magnetic Attraction Elements" filed Aug. 5, 2013 by Richards et al., now U.S. Pat. No. 8,692,637, which is a continuation-in-part of non-provisional application Ser. No. 13/759,695, titled "System and Method for Defining Magnetic Structures" filed Feb. 5, 2013 by Fullerton et al, now U.S. Pat. No. 8,502,630, which is a continuation of application Ser. No. 13/481,554, titled "System and Method for Defining Magnetic Structures", filed May 25, 2012, by Fullerton et al., now U.S. Pat. No. 8,368,495, which is a continuation-in-part of non-provisional application Ser. No. 13/351,203, titled "A Key System For Enabling Operation Of A Device", filed Jan. 16, 2012, by Fullerton et al., now U.S. Pat. No. 8,314,671 and claims the benefit under 35 USC 119(e) of provisional application 61/519,664, titled "System and Method for Defining Magnetic Structures", filed May 25, 2011 by Roberts et al.

Non-provisional application Ser. No. 13/351,203 is a continuation of application Ser. No. 13/157,975, titled "Magnetic Attachment System with Low Cross Correlation", filed Jun. 10, 2011, by Fullerton et al., now U.S. Pat. No. 8,098,122, which is a continuation of application Ser. No. 12/952,391, titled "Magnetic Attachment System", filed Nov. 23, 2010 by Fullerton et al., now U.S. Pat. No. 7,961,069.

Non-provisional application Ser. No. 12/952,391 is a continuation of application Ser. No. 12/478,911, titled "Magnetically Attachable and Detachable Panel System" filed Jun. 5, 2009 by Fullerton et al., now U.S. Pat. No. 7,843,295.

Non-provisional application Ser. No. 12/952,391 is also a continuation of application Ser. No. 12/478,950, titled "Magnetically Attachable and Detachable Panel Method," filed Jun. 5, 2009 by Fullerton et al., now U.S. Pat. No. 7,843,296.

Non-provisional application Ser. No. 12/952,391 is also a continuation of application Ser. No. 12/478,969, titled "Coded Magnet Structures for Selective Association of Articles," filed Jun. 5, 2009 by Fullerton et al., now U.S. Pat. No. 7,843,297.

Non-provisional application Ser. No. 12/952,391 is also a continuation of application Ser. No. 12/479,013, titled "Magnetic Force Profile System Using Coded Magnet Structures," filed Jun. 5, 2009 by Fullerton et al., now U.S. Pat. No. 7,839,247.

The preceding four applications are each a continuation-in-part of non-provisional application Ser. No. 12/476,952, filed Jun. 2, 2009, titled "A Field Emission System and Method", by Fullerton et al., now U.S. Pat. No. 8,179,219, which is a continuation-in-part of non-provisional application Ser. No. 12/322,561, filed Feb. 4, 2009 titled "System and Method for Producing an Electric Pulse", by Fullerton et al., now U.S. Pat. No. 8,115,581, which is a continuation-in-part of non-provisional application Ser. No. 12/358,423, filed Jan. 23, 2009 titled "A Field Emission System and Method", by Fullerton et al., now U.S. Pat. No. 7,868,721, which is a continuation-in-part of non-provisional application Ser. No. 12/123,718, filed May 20, 2008 titled "A Field Emission System and Method", by Fullerton et now U.S. Pat. No. 7,800,471, which claims the benefit of U.S. Provisional Patent Application No. 61/123,019, filed Apr. 4, 2008, which is entitled "A Field Emission System and Method".

Non-provisional application Ser. No. 14/103,760 is also a continuation-in-part of U.S. patent application Ser. No. 13/918,921, filed Jun. 15, 2013 titled "Detachable Cover System", by Fullerton et al., which is a continuation of U.S. patent application Ser. No. 13/629,879, filed Sep. 28, 2012, now U.S. Pat. No. 8,514,046, which is a continuation of U.S. patent application Ser. No. 13/426,909, filed Mar. 22, 2012, now U.S. Pat. No. 8,279,032, which is a continuation-in-part of U.S. non-provisional patent application Ser. No. 13/179,759, filed Jul. 11, 2011, now U.S. Pat. No. 8,174,347, and claims the benefit of U.S. Provisional Application 61/465,810, filed Mar. 24, 2011, which is entitled "Electromagnet Based Detachment System".

Non-provisional application Ser. No. 14/103,760 is also a continuation-in-part of U.S. non-provisional patent application Ser. No. 14/045,756, filed Oct. 3, 2013, which is entitled "System and Method for Tailoring Transition Regions of Magnetic Structures", now U.S. Pat. No. 8,810,348, which claims the benefit of U.S. Provisional Patent Application No. 61/744,864, filed Oct. 4, 2012, which is entitled "System And Method for Tailoring Polarity Transitions of Magnetic Structures".

Non-provisional application Ser. No. 14/045,756 is a continuation-in-part of U.S. non-provisional patent application Ser. No. 13/240,335, filed Sep. 22, 2011, which is entitled "Magnetic Structure Production", now U.S. Pat. No. 8,648,681, issued Feb. 11, 2014, which claims the benefit of U.S. Provisional Patent Application No. 61/403,814, filed Sep. 22, 2010 and U.S. Provisional Patent Application No. 61/462,715, filed Feb. 7, 2011, both of which are entitled "System And Method For Producing Magnetic Structures".

Non-provisional application Ser. No. 13/240,335 is a continuation-in-part of U.S. Pat. No. 8,179,219, issued May 15, 2012, which is entitled "Field Emission System and Method".

Non-provisional application Ser. No. 13/240,335 is also a continuation-in-part of U.S. non-provisional patent application Ser. No. 12/895,589, filed Sep. 30, 2010, now U.S. Pat. No. 8,760,250, which is entitled "A System And Method For Energy Generation", which claims the benefit of Provisional Patent Application Nos. 61/277,214, filed Sep. 22, 2009, 61/277,900, filed Sep. 30, 2009, 61/278,767, filed Oct. 9, 2009, 61/279,094, filed Oct. 16, 2009, 61/281,160, filed Nov. 13, 2009, 61/283,780, filed Dec. 9, 2009, 61/284,385, filed Dec. 17, 2009, and 61/342,988, filed Apr. 22, 2010.

Non-provisional application Ser. No. 12/895,589 is a continuation-in-part of U.S. Pat. No. 7,982,568, issued Jul. 19, 2011, and U.S. Pat. No. 8,179,219, issued May 15, 2012; Ser. No. 14/045,756 is also a continuation-in-part of U.S. patent application Ser. No. 13/246,584, filed Sep. 27, 2011, which is entitled "System and Method for Producing Stacked Field Emission Structures".

This application is also a continuation-in-part of non-provisional application Ser. No. 14/258,776, titled "System and Method for Moving an Object", filed Apr. 22, 2014 by Fullerton et al., which is a continuation of non-provisional application Ser. No. 13/104,393, titled "System and Method for Moving and Object", filed May 10, 2011, now U.S. Pat. No. 8,704,626, which claims the benefit under 35 USC 119(e) of provisional applications 61/395,205, titled "System and Method for Moving and Object", filed May 5, 2010 by Fullerton et al.

The contents of the provisional patent applications, the contents of the non-provisional patent applications, and the contents of the issued patents that are identified above are hereby incorporated by reference in their entirety herein.

FIELD OF THE INVENTION

The present invention relates generally to a magnetic valve assembly. More particularly, the present invention relates to a valve assembly where the movement of a first disc relative to a second disc is controlled across a barrier using complementary magnetic structures.

BACKGROUND OF THE INVENTION

Certain water valve assemblies that control the flow of hot and cold water into and out of faucets use a movement control mechanism to control a valve mechanism comprising two or more discs that are configured to control flow and mixing of hot and cold water while also providing a seal intended to prevent leakage of water out of the faucet. The movement control mechanism of such valve assemblies typically involves a moveable handle connected to a stem or lever that is rotated to rotate a first disc relative to a second disc. Alternatively, the stem may pivot a ball within a housing, where the ball has a knuckle that extends into a recess of a first disc configured to slide on a second disc that is fixed doesn't move). Generally, movement of the handle controls rotational and/or translational movement of the first disc relative to the second disc, where the relative location of the first disc to the second disc determines whether holes and/or channels associated with the discs are aligned which subsequently determines whether or not hot and/or cold water flows through the valve and also the mixing of hot and cold water flowing through the valve. With some assemblies, a third disc located between the first and second discs is used to provide a water film that lubricates the first and second discs and provides a seal. With other such assemblies, a lubricating grease is used to provide a seal. Examples of disc-based valve systems are described in U.S. Pat. No. 4,823,841 issued Apr. 25, 1989, U.S. Pat. No. 5,100,565 issued Mar. 31, 1992, U.S. Pat. No. 6,904,935 issued Jun. 14, 2005, U.S. Pat. No. 7,134,452 issued Nov. 14, 2006, U.S. Pat. No. 7,628,173 issued Dec. 8, 2009, and U.S. Pat. No. 7,980,268 issued Jul. 19, 2011, which are all incorporated herein in their entirety.

FIG. 1A depicts an exemplary faucet 100 that includes a prior art valve assembly 7. Specifically, the valve assembly is a Delta® faucet valve cartridge model number RP50587. Referring to FIG. 1A, the exemplary faucet 100 comprises an aerator 1 that fits into a spray head 3, which may require use of a wrench 2. The faucet 100 also comprises a handle 4, cap 5, and bonnet nut 6. The handle 4 is attached to the valve assembly 7, for example, using a set screw that can be tightened using an Allen wrench.

FIG. 1B shows three different views of the Delta RP50587 valve assembly 7 and corresponding puck 8, which is integrated with waterways 9 comprising hot and cold water inlet lines and a water outlet line. The puck is attached to the bottom of the valve assembly 7.

FIGS. 1C-1F depict various views of the primary components of the exemplary valve assembly 7. Referring to FIGS. 1C-1F, valve assembly 7 comprises a movement control mechanism 10 and a valve mechanism 12. The movement control mechanism 10 comprises a stem assembly 24, which can be attached to a handle 4. The valve assembly comprises a movable ceramic disc 14 and a stationary Diamond-embedded disc 16. The stem assembly 24 includes a ball 22 having a knuckle 18 that can be placed into a recess 20 of the ceramic disc 14. The ball 22 is movable within a housing 26, where its movement is constrained by a handle limit stop 28. A rubber gasket 30 provides a seal with puck 8. The purpose of the two discs 14 and 16 is to control whether hot and/or cold water flow through the valve and the mixing of the hot and cold water. The two discs are also configured to provide a seal such that water stays below the ceramic disc 14 and does not leak out into the faucet 100.

FIGS. 1G-1L depict the exemplary moveable disc 14 and stationary disc 16 and depict how relative alignment of the two discs controls the water mixing of the valve. Specifically, FIG. 1C depicts the Diamond-embedded disc 16 having water inlet holes 32 for receiving hot and cold water and a water outlet hole 34. FIG. 1H depicts the top of the movable disc 14, which has a recess 20 in which the knuckle 18 associated with the ball 22 resides. The ball 22 and handle limit stop 28 limit the movement of the handle 4 and constrain the movement of the movable disc 14 such that it can only move translationally and not rotationally relative to the stationary disc 16 as indicated by the arrows. Four different locations of the moveable disc 14 relative to the bottom of the housing 26 of the movement control mechanism are shown in FIGS. 1I-1L. The bottom of the moveable disc 14 includes a channel 36, a central portion 38, and an outer portion 40. As such, one skilled in the art will understand that movement of the knuckle controls translational movement of the moveable disc 14 and thereby controls the alignment of the channel 36 and central portion 38 of the moveable disc 14 relative to the water inlet holes 32 of the stationary disc 16. Specifically, rotational and/or translational movement of the stem 24 (e.g., using a handle 4) moves the knuckle 18 that is located within the recess 20 of the ceramic disc 14, which results in translational movement of the ceramic disc 14 relative to the diamond-embedded disc 16. The relative location of the central portion 38 of the bottom of the ceramic disc 14 to the hot and cold water inlets 32 of the diamond-embedded disc 16 controls whether the flow of hot and/or code water is on or off and also determines the mixing of the hot and cold water.

FIGS. 1M and 1N depict solid and cutaway views of a simplified CAD model of the exemplary valve assembly 7. Referring to FIGS. 1M and 1N, valve assembly 7 comprises movement control mechanism 10, valve mechanism 12, puck 8, and waterways 9.

As explained above, modern disc-based valve assemblies typically involve discs having precisely polished surfaces that provide a longer lasting seal, where the disc polishing process can be quite expensive. But, such assemblies can eventually develop leaks between the discs after extended periods of operation, which can result in substantial property damage and thus there remains a liability concern of faucet leakage. Therefore, an improved disc-based valve-system is desirable whereby disc polishing requirements are relieved and leakage of water between the discs is no longer a concern.

SUMMARY OF THE INVENTION

Briefly, according to the present invention, a valve assembly comprises a sealed container connected to a hot water supply line and a cold water supply line. The sealed container has an outlet for supplying at least one of hot water or cold water to a faucet. A valve mechanism is located inside the sealed container comprising a stationary mixing part and a moveable mixing part. A magnetic coupling adapter has a first magnetic structure located outside of a wall of the sealed container. A first magnetic structure is made of a first magnetizable material having a first plurality of first printed maxels having a first polarity pattern. A second magnetic structure located inside the wall of the sealed container is made of a second magnetizable material having a second plurality of second printed maxels having a second polarity pattern that is complementary to the first polarity pattern. The first magnetic structure and second magnetic structure are magnetically coupled across the wall of the sealed container. A first adapter interface component located outside of the wall of the sealed container is associated with the first magnetic structure. A second adapter interface component located inside the wall of the sealed container is associated with the second magnetic structure and the moveable mixing part. A movement control mechanism includes a moveable handle associated with the first adapter interface, which is configured to control a movement of the magnetic coupling adapter and thereby a movement of the moveable mixing part to control flow and mixing of the hot and cold water.

According to some of the more detailed features of the invention, the stationary mixing part comprises a first side and a second side opposite said first side. The first side of the stationary mixing part can comprise a first inlet configured to receive hot water from hot water supply line, a second inlet configured to receive cold water from cold water supply line, and an outlet for supplying at least one of hot water and cold water to the faucet, with the first and second inlets and said outlet extending from the first side of the stationary mixing part to the second side of said stationary mixing part. The moveable mixing part can comprises a first side and a second side opposite the first side. The first side of the moveable mixing part can comprise an outer portion, an inner portion, and a channel. The second side of the stationary mixing part and the first side of the movable mixing part can be configured to interface with each other to provide a seal intended to prevent leakage of at least one of the cold water and hot water out of the valve mechanism.

According to other more featured of the invention, a location of the inner portion of the first side of the moveable mixing part relative to the first and second inlets of the second side of the stationary mixing part controls the flow and the mixing of hot water and cold water. A moveable handle can be configured for rotational movement or translational movement.

According to still other more featured of the invention, the movement control mechanism further comprises a stem assembly attached to the handle and associated with said the adapter interface component, in one embodiment, the stem assembly comprises a ball having a knuckle that can be placed into a recess of the first adapter interface component. The ball can be movable within a housing or constrained. The movement of the moveable mixing part can be rotational movement or a translational movement. A puck can be associated with the stationary mixing part. A gasket can be positioned between the puck and the stationary mixing part. A tap between can be positioned between least one of the cold water supply line and the hot water supply line and the sealed container. A piston can be connected to the tap. The sealed container can be filled with grease.

BRIEF DESCRIPTION OF THE DRAWINGS

FIG. 1B shows three different views of the valve assembly of FIG. 1.

FIGS. 2A and 2B depict solid and cutaway views of an exemplary valve assembly according to the present invention.

FIGS. 2C and 2D depict solid and cutaway views of the components of a magnetic coupling adapter of the valve assembly shown in FIGS. 2A and 2B.

FIGS. 3A and 3B depict exemplary first and second magnetic structures used in the valve assembly shown in FIGS. 2A and 2B.

FIG. 3C shows maxels printed from the top side of a magnetic material.

FIG. 3D depicts maxels printed from both sides of a material that resemble cylinders.

FIGS. 3E and 3F depicts overlapping maxels printed on a magnetic material.

FIGS. 4A and 4B depict top and side views of exemplary shunt plates.

FIG. 5A depicts a first magnetic structure on a first side of a barrier and a second magnetic structure on the a second side of the barrier.

FIG. 5B depicts a first magnetic structure on a first side of a barrier and a second magnetic structure on a second side of the barrier 202 that is opposite the first side of the barrier.

FIGS. 6A and 6B depict views of the maxel pattern on the bottom side of a first magnetic structure and the maxel pattern on the top side of a second magnetic structure.

FIG. 6C depicts the top side of the first magnetic structure when placed on top of the second magnetic structure, where a barrier is showing being between the two structures.

DETAILED DESCRIPTION OF THE INVENTION

Figure 1A:
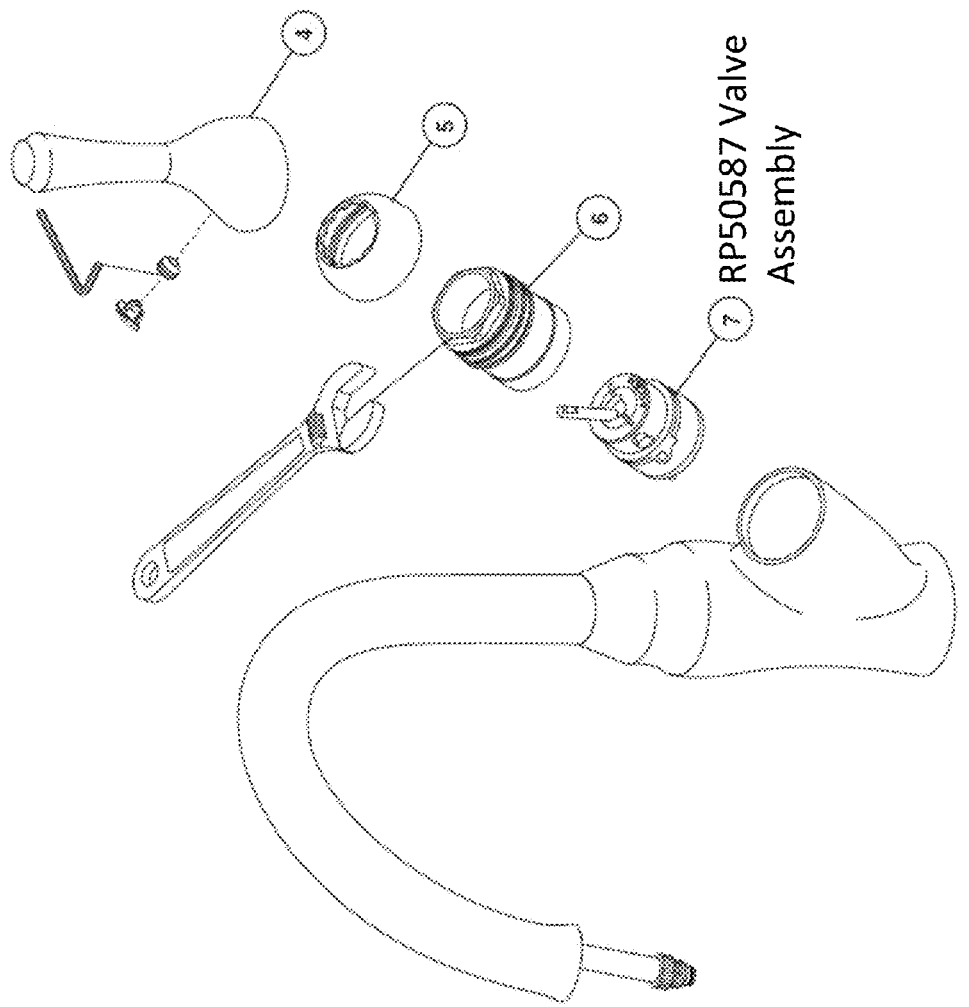
FIG. 1A depicts an exemplary faucet that includes a prior art valve assembly.
Figure 1E:
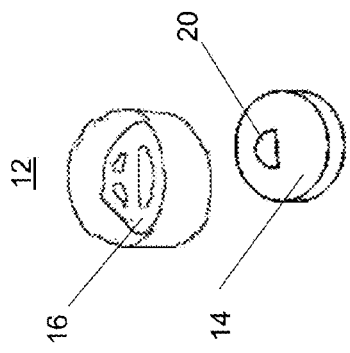
FIGS. 1C-1F depict various views of the primary components of the valve assembly of FIG. 1.
Figure 1F:
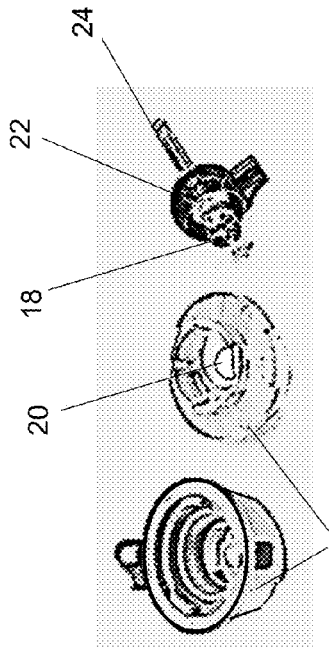
Figure 1C:
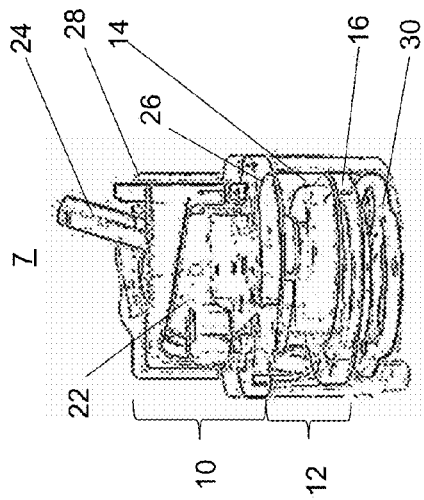
Figure 1D:
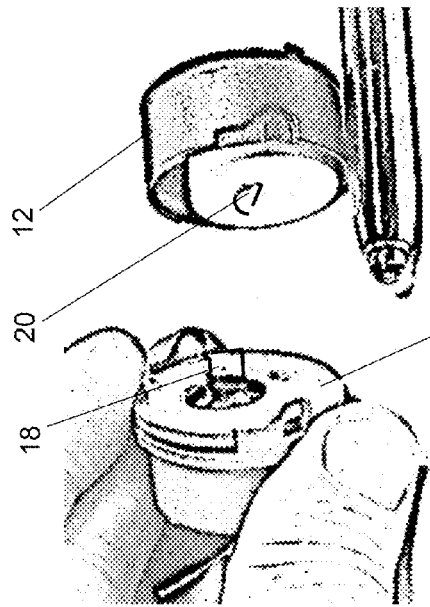
Figure 1J:
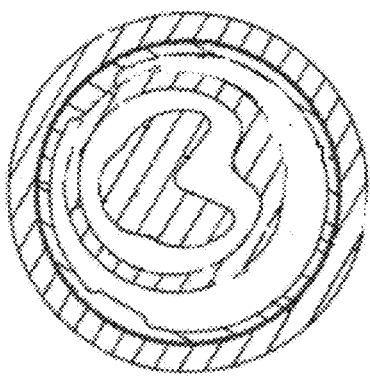
FIGS. 1G-1L depict a moveable disc and a stationary disc in the valve assembly of FIG. 1.
Figure 1I:
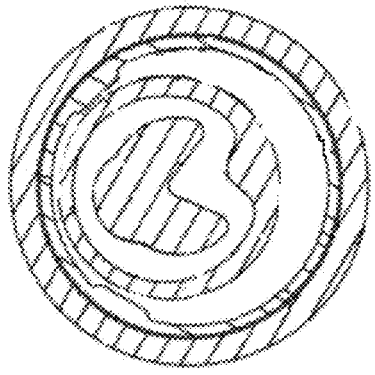
Figure 1G:
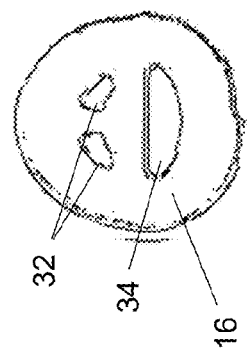
Figure 1H:
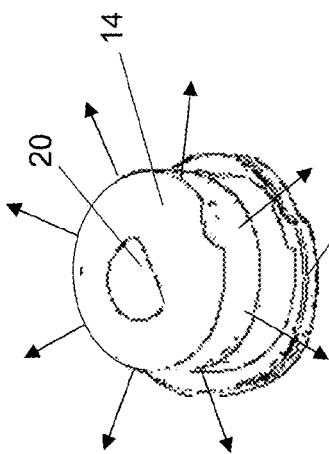
Figure 1L:
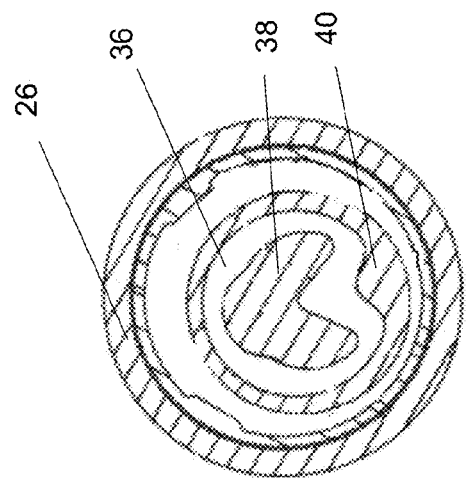
Figure 1K:
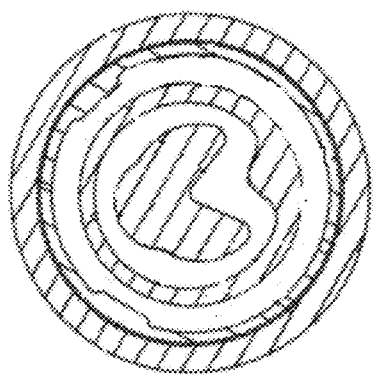
Figure 1N:
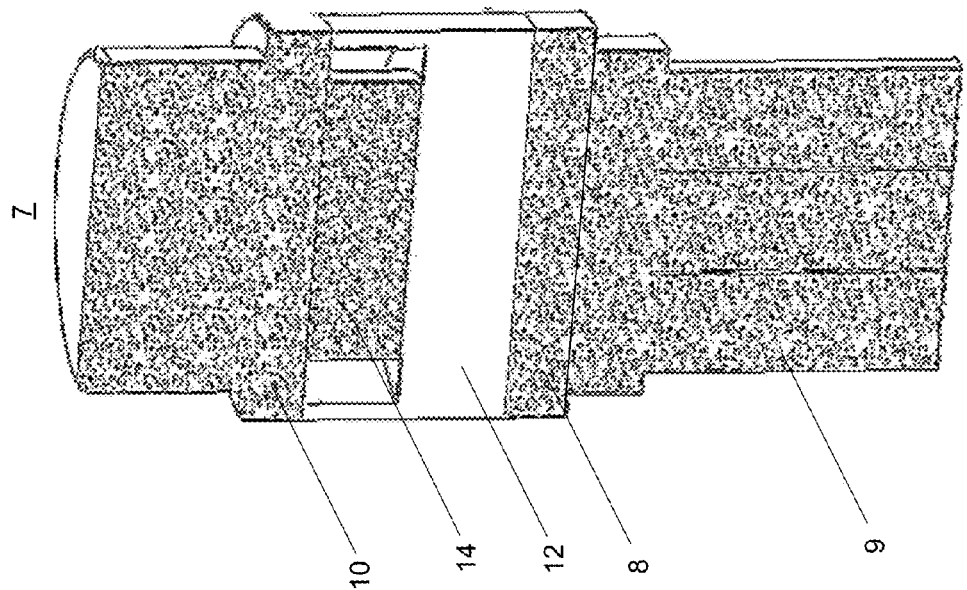
FIGS. 1M and 1N depict solid and cutaway views of a simplified CAD model of the valve assembly of FIG. 1.
Figure 1M:
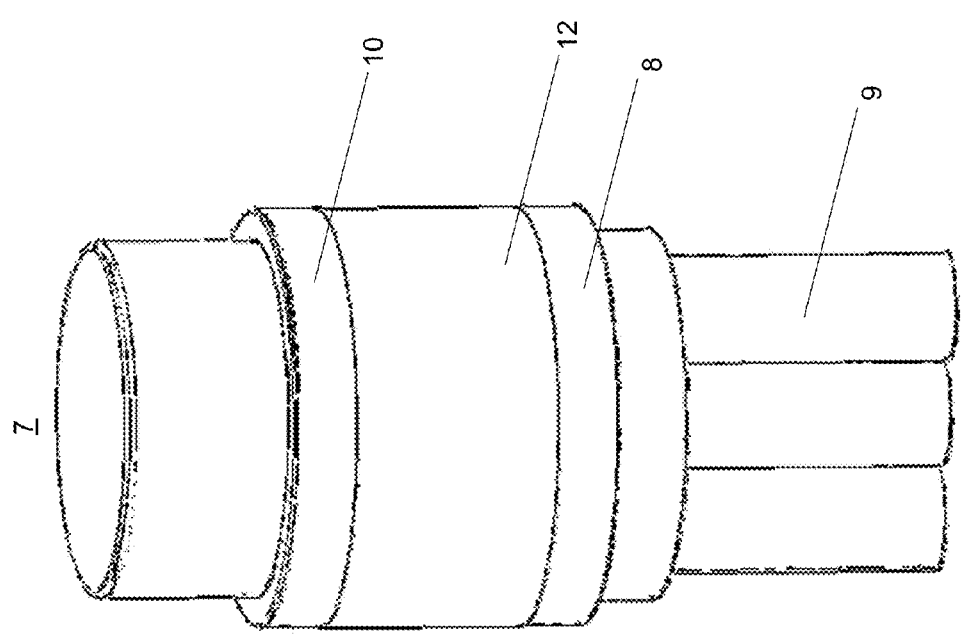

Certain described embodiments of the invention described herein may relate by way of example, but not limitation, to systems and/or apparatuses comprising magnetic structures, magnetic and non-magnetic materials, methods for using magnetic structures, magnetic structures produced via magnetic printing, magnetic structures comprising arrays of discrete magnetic elements, combinations thereof, and so forth. Example realizations for such embodiments may be facilitated, at least in part, by the use of an emerging, revolutionary technology that may be termed correlated magnetics. This revolutionary technology referred to herein as correlated magnetics was first fully described and enabled in the co-assigned U.S. Pat. No. 7,800,471 issued on Sep. 21, 2010, and entitled "A Field Emission System and Method". The contents of this document are hereby incorporated herein by reference. A second generation of a correlated magnetic technology is described and enabled in the co-assigned U.S. Pat. No. 7,868,721 issued on Jan. 11, 2011, and entitled "A Field Emission System and Method". The contents of this document are hereby incorporated herein by reference. A third generation of a correlated magnetic technology is described and enabled in the co-assigned U.S. Pat. No. 8,179,219, issued May 15, 2012, and entitled "A Field Emission System and Method". The contents of this document are hereby incorporated herein by reference. Another technology known as correlated inductance, which is related to correlated magnetics, has been described and enabled in the co-assigned U.S. Pat. No. 8,115,581 issued on Feb. 14, 2012, and entitled "A System and Method for Producing an Electric Pulse". The contents of this document are hereby incorporated by reference.

Material presented herein may relate to and/or be implemented in conjunction with multilevel correlated magnetic systems and methods for producing a multilevel correlated magnetic system such as described in U.S. Pat. No. 7,982,568 issued Jul. 19, 2011 which is all incorporated herein by reference in its entirety.

Material presented herein may relate to and/or be implemented in conjunction with systems and methods pertaining to magnetic coupling across a barrier such as described in U.S. Pat. No. 8,222,986 issued Jul. 17, 2012, which is all incorporated herein by reference in its entirety. Material presented herein may relate to and/or be implemented in conjunction with systems and methods pertaining to magnetic coupling across a barrier such as described in U.S. Pat. No. 8,704,626 issued Apr. 22, 2014, which is all incorporated herein by reference in its entirety.

Such systems and methods described in U.S. Pat. No. 7,681,256 issued Mar. 23, 2010, U.S. Pat. No. 7,750,781 issued Jul. 6, 2010, U.S. Pat. No. 7,755,462 issued Jul. 13, 2010, U.S. Pat. No. 7,812,698 issued Oct. 12, 2010, U.S. Pat. Nos. 7,817,002, 7,817,003, 7,817,004, 7,817,005, and 7,817,006 issued Oct. 19, 2010, U.S. Pat. No. 7,821,367 issued Oct. 26, 2010, U.S. Pat. Nos. 7,823,300 and 7,824,083 issued Nov. 2, 2011, U.S. Pat. No. 7,834,729 issued Nov. 16, 2011, U.S. Pat. No. 7,839,247 issued Nov. 23, 2010, U.S. Pat. Nos. 7,843,295, 7,843,296, and 7,843,297 issued Nov. 30, 2010, U.S. Pat. No. 7,893,803 issued Feb. 22, 2011, U.S. Pat. Nos. 7,956,711 and 7,956,712 issued Jun. 7, 2011, U.S. Pat. Nos. 7,958,575, 7,961,068 and 7,961,069 issued Jun. 14, 2011, U.S. Pat. No. 7,963,818 issued Jun. 21, 2011, and U.S. Pat. Nos. 8,015,752 and 8,016,330 issued Sep. 13, 2011, and U.S. Pat. No. 8,035,260 issued Oct. 11, 2011, and U.S. Pat. No. 8,174,347 issued May 8, 2012, and U.S. Pat. Nos. 8,279,031 and 8,279,032 issued Oct. 2, 2012, and U.S. Pat. No. 8,368,495 issued Feb. 5, 2013 are all incorporated by reference herein in their entirety.

Such systems and methods described in U.S. Pat. No. 8,648,681 issued Feb. 11, 2014, U.S. Pat. No. 8,760,251 issued Jun. 24, 2014, and U.S. Pat. No. 8,576,036 issued Nov. 5, 2013, and U.S. patent application Ser. No. 13/604,939 filed Sep. 6, 2012, Ser. No. 13/659,444 filed Oct. 23, 2012, Ser. No. 13/687,819 filed Nov. 28, 2012, Ser. No. 13/779,611 filed Feb. 27, 2013, and Ser. No. 13/959,201 filed Aug. 5, 2013, which are all incorporated by reference herein in their entirety.

In accordance with one aspect of the invention, a magnetic valve assembly comprises a movement control mechanism and a valve mechanism. The movement control mechanism comprises a first magnetic structure having a first plurality of magnetic source regions having a first polarity pattern and a second magnetic structure having a second plurality of magnetic source regions having a second polarity pattern that is complementary to said first polarity pattern. The first magnetic structure is placed into complementary alignment with the second magnetic structure such that the two magnetic structures are magnetically coupled (attached) across a plane corresponding to a barrier, for example, a wall of a sealed container to which hot and cold water supply lines are connected to respective hot and cold water inlets and from which water can be supplied via a water outlet. The movement control mechanism includes a moveable handle that can rotate and/or translate, where the handle is attached to a stem or lever that is attached or otherwise associated with the first magnetic structure such that movement of the handle controls rotational and/or translational movement of the first magnetic structure.

The valve mechanism comprises two or more discs including at least one movable disc and a stationary (or fixed) disc constituting each constituting a corresponding mixing parts, where the relative location of the at least one movable mixing part/disc relative to the stationary mixing part/disc determines the alignment of holes and/or channels associated with the mixing parts/discs that determines whether hot and/or cold water flows through the valve and also the mixing of the hot and cold water. The second magnetic structure is attached to or otherwise associated with the at least one movable disc such that rotational and/or translational movement of the first magnetic structure produces respective rotational and/or translational movement of the second magnetic structure and the at least one moveable disc.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

FIGS. 2A and 2B depict solid and cutaway views of an exemplary valve assembly 200 according to one embodiment of the invention. The valve assembly 200 comprises the movement control mechanism 10, valve mechanism 12, puck 8, and waterways 9 of the exemplary valve assembly 7 plus a magnetic coupling adapter 204 that enables magnetic coupling across a non-ferromagnetic material barrier 202 that is part of a sealed container, where the adapter can move translationally relative to the barrier 202, where the barrier 202 remains fixed relative to the adapter 204. The adapter 204 includes a recess 20 for receiving the knuckle 18 of the ball 22 of the movement control mechanism 10 and includes a cavity for receiving the ceramic disc 14. As such, the translational movement of the magnetic coupling adapter 204 of the exemplary modified valve assembly 200 is controlled by the movement control mechanism 10 in the same manner as the ceramic disc 14 was controlled in the exemplary valve assembly 7 and because the adapter 204 can move translationally relative to the barrier 202 the movement of the ceramic disc 14, which is attached to or otherwise associated with the adapter 204 moves in the same manner as if it were instead attached to or otherwise associated with the movement control mechanism 10.

FIGS. 2C and 2D depict solid and cutaway views of the components of the magnetic coupling adapter 204 of the valve assembly 200. Referring to FIGS. 2C and 2D, magnetic coupling adapter 204 comprises a first magnetic structure 206 and a second magnetic structure 208 that are on opposite sides of the barrier 202, where the two magnetic structures are magnetically coupled (or attached) across the barrier 202 that formed a sealed container. A first adapter interface component 210 includes a recess 20 on its topside for receiving the knuckle 18 of the movement control system 10 and has a cavity on its bottom side for receiving the first magnetic structure 206. A second adapter interface component 212 includes a cavity on its top side for receiving the second magnetic structure 206 and a cavity on its bottom side for receiving ceramic disc.

One skilled in the art will understand that the magnetic structures need not the round and that the magnetic structures and ceramic discs can be secured in their respective cavities in various ways. For example, the magnetic structures and ceramic discs can be secured in their respective cavities using an adhesive or using set screws. Not shown in FIGS. 2C and 2D are optional shunt plates that would be located on top of the first magnetic structure and beneath the second magnetic structure. The shunt plates could be placed into the respective cavities for receiving the magnetic structures prior to the magnetic structures being placed into the cavities or, alternatively, the shunt plates could be attached, for example using an adhesive, to the magnetic structures prior to their being placed into their respective cavities. Shunt plates are described in U.S. patent application Ser. No. 13/374,074 filed Dec. 9, 2011, which is incorporated herein by reference in its entirety. Also not shown are optional anti-friction layers that can be placed between each of the two magnetic structures and the barrier 202. Examples of anti-friction layers are layers of an anti-friction tape such as a Teflon-coated tape, where the tape can be attached to the magnetic structures or may be attached to the barrier.

One skilled in the art will recognize that instead of using the second adapter interface component 212, the second magnetic structure could be integrated directly into the ceramic disc 14 and that many different configurations of magnetic structures can be used to provide the magnetic coupling across the barrier of the sealed container. For example, the first magnetic structure could have a recess or hole that functions like recess 20 of the ceramic disc 14.

FIGS. 3A and 3B depict exemplary first and second magnetic structures 206, 208, respectively, which have magnetic sources having complementary polarity patterns. Referring to FIGS. 3A and 3B, magnetic sources are represented by circles having either a + or − symbol, where a + represents a positive (or North) polarity magnetic source 302 and a − represents a negative (or South) polarity magnetic source 304. The polarity patterns of two structures are complementary such that when the bottom of the first magnetic structure is placed on top of the second magnetic structure in a complementary alignment position, the various magnetic sources of the two structures will each be aligned with a magnetic source that is of opposite polarity such that the two magnetic structure produce a peak spatial attract force.

One skilled in the art will understand that magnetic sources may be discrete magnets integrated into or onto a substrate or, preferably, may be magnetic sources printed into magnetizable material, which may be referred to as maxels, and the polarities and relative locations of the magnetic sources can be selected to achieve desirable shear and/or torque characteristics. For example, maxels may be arranged in concentric circles where the maxels of each circle are offset from maxels of adjacent circles or where the maxels of each circle are arranged to resemble a radial pattern, which might be used given a requirement for rotational movement by the movement control mechanism. Maxel polarities may be selected to provide a substantially uniform shear behavior in all translational directions or selected to provide different shear behaviors depending on the direction of movement. Similarly, to achieve desired shear or torque characteristics, maxel field strengths may be varied, maxel sizes may be varied, maxel shapes may be varied, etc.

One skilled in the art will understand that the size and shape of maxels or of groups of maxels can be selected based on characteristics of the magnetic material being used, for example the grade and thickness of the material. Maxels may be printed from only one side of the material or from both sides of the material. The dotted lines of FIG. 3C represent maxels printed from the top side of the magnetic material. As shown, the portion of the maxels within the material resemble paraboloids, which is a shape selected as a representation (or model) of the actual shapes of the maxels inside of the material. Another shape used to represent maxels is a conic shape, which resembles a Dixie cup. FIG. 3D depicts maxels printed from both sides of the material that resemble cylinders, which is yet another shape selected as a representation (or model) of the actual shapes of the maxels inside of the material. One skilled in the art will understand that the actual shape of maxels, whether printed from one side, two sides, or even more sides of a piece of material depends on numerous printing parameters and material parameters and that all sorts of magnetic structures including those having maxels printed inside of maxels can be used in accordance with the invention. Maxel printing techniques are described in U.S. patent application Ser. No. 13/240,335 filed Sep. 22, 2011, which is incorporated by reference in its entirety.

Under one arrangement a two-dimensional pattern of rows and columns of alternating polarity magnetic sources can be used. Under another arrangement, the magnetic sources of a given row may be shifted relative to an adjoining row of magnetic sources such as depicted in FIGS. 3A and 3B. Maxels may be printed such that they abut each other such as shown in FIG. 3C or they may be printed such that they overlap as depicted in FIGS. 3E and 3F. Different sized maxels can be used within the same magnetic structure, sacrificial material may be used during printing, and so on.

Figure 3H:
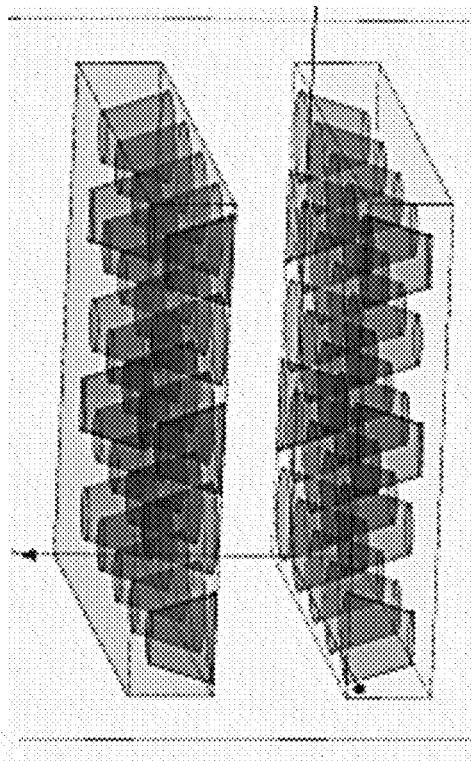
FIGS. 3G and 3H depict complementary alignment of magnetic structures.
Figure 3G:
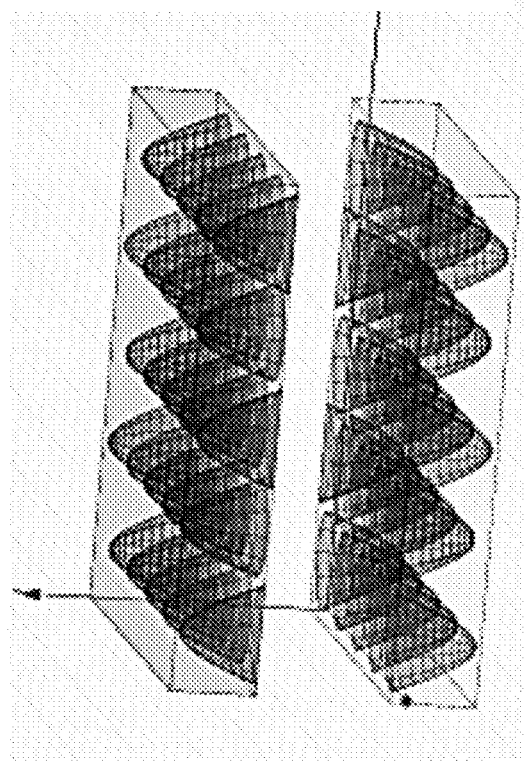

FIGS. 3G and 3H depict complementary alignment of magnetic structures using maxels represented by parabaloid and conic shapes, respectively.

FIGS. 4A and 4B depict top and side views of exemplary shunt plates that can be used in accordance with the invention.

FIG. 5A depicts a first magnetic structure 206 on a first side of a barrier 202 and a second magnetic structure 208 on the a second side of the barrier 202 that is opposite the first side of the barrier 202, thereby forming the sealed container, where shunt plates 402 are shown on top of the first magnetic structure 206 and beneath the second magnetic structure 208.

FIG. 5B depicts a first magnetic structure 206 on a first side of a barrier 202 and a second magnetic structure 208 on the a second side of the barrier 202 that is opposite the first side of the barrier 202, where shunt plates 402 are shown on top of the first magnetic structure 206 and beneath the second magnetic structure 208 and anti-friction layers 502 (e.g., Teflon tape) are shown between the magnetic structures 206, 208 and the barrier 202.

Figure 5C:
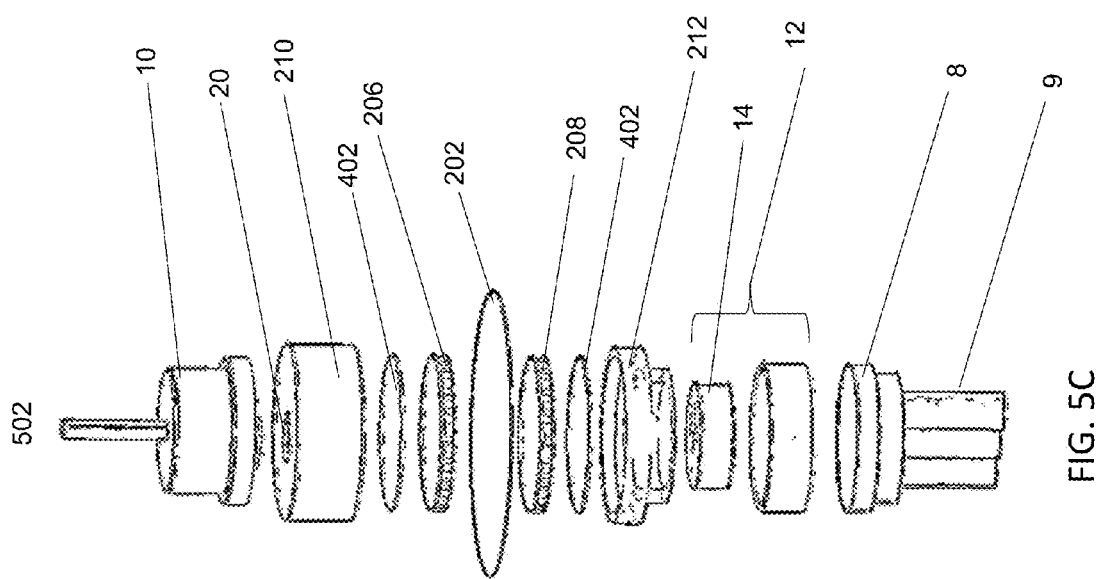
FIG. 5C depicts a solid view of an exemplary valve assembly that is the same as the valve assembly of FIGS. 2A-2D except shunt plates are shown above the first magnetic structure and beneath the second magnetic structure.

FIG. 5C depicts a solid view of an exemplary valve assembly 500 that is the same as the valve assembly 200 of FIGS. 2A-2D except shunt plates 402 are shown above the first magnetic structure 206 and beneath the second magnetic structure 208.

Under one arrangement, the magnetic structures used in the invention are magnetized to exhibit multi-level magnetism behavior. For example, structures exhibiting contactless attachment behavior can be constrained to minimize contact with the barrier yet provide magnetic attachment and sufficient shear/torque necessary to remain coupled when controlling the valve mechanism 12. FIGS. 6A and 6B depict views of the maxel pattern on the bottom side of a first magnetic structure 602 and the maxel pattern on the top side of a second magnetic structure 604, where the maxels have been printed on a conventionally magnetized material. As such, the printing of negative polarity maxels on the negative side of a conventional magnet or printing of positive polarity maxels on the positive side of a conventional magnet is optional. FIG. 6C depicts the top side of the first magnetic structure 602 when placed on top of the second magnetic structure 604, where a barrier 202 is shown being between the two structures. As shown, the two magnetic structures are constrained on that movement is restricted to the directions indicated by the arrows.

Figure 7:
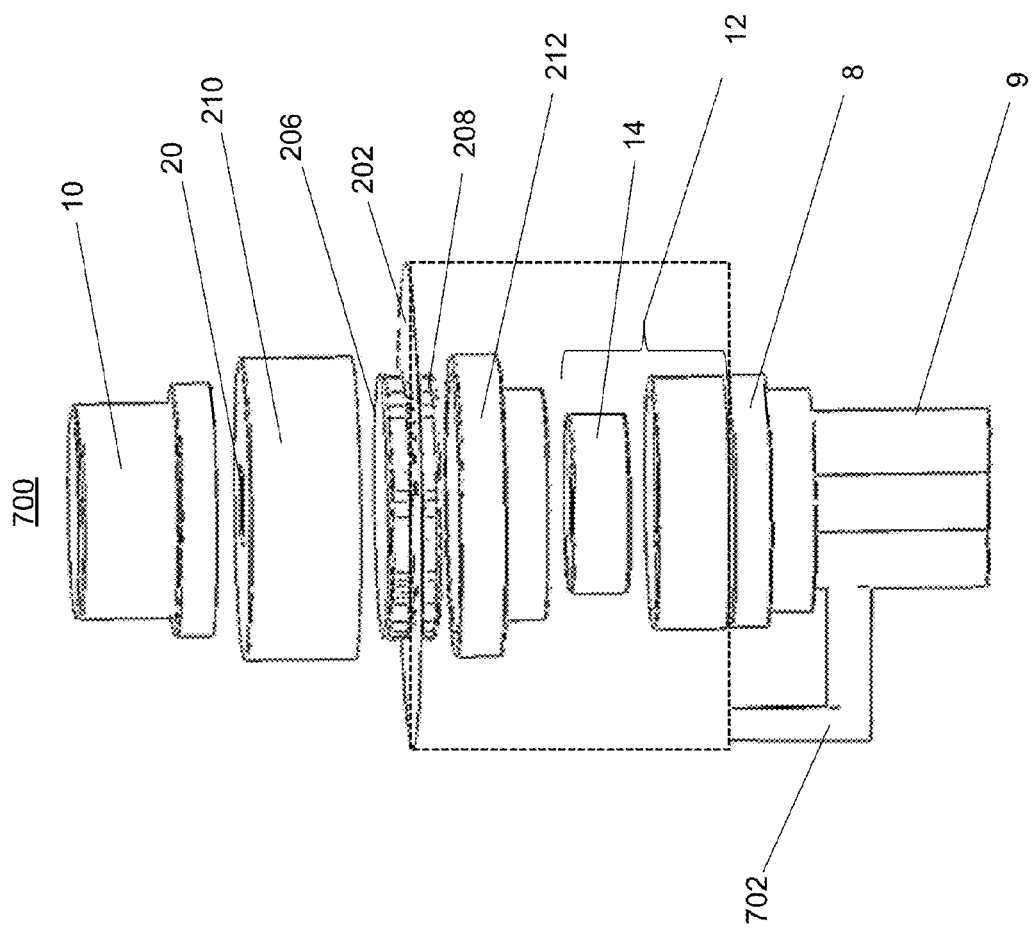
FIG. 7 depicts a valve assembly according to another embodiment of the present invention.

FIG. 7 depicts a valve assembly 700, which is like the valve assembly 200 except the puck encompasses all the components shown within the dotted region such that a hermetically sealed container is created. A tap 702 of the cold (or hot) water supply line into the container can be used to fill the container with water so as to equalize the pressure in the container. When water pressure has been equalized, water will not leak between the two disks. Optionally, the container can be filled with grease or some other material and a membrane or piston can be connected to the tap 702 to equalize pressure in the container.

While particular embodiments of the invention have been described, it will be understood, however, that the invention is not limited thereto, since modifications may be made by those skilled in the art, particularly in light of the foregoing teachings.

The invention claimed is:

1. A valve assembly, comprising:
   a sealed container connected to a hot water supply line and a cold water supply line, said sealed container having an outlet for supplying at least one of a hot water or a cold water to a faucet;
   a valve mechanism located side said sealed container, said valve mechanism comprising:
      a stationary mixing part; and
      a moveable mixing part;
   a magnetic coupling adapter, comprising:
      a first magnetic structure located outside of a wall of said seated container, said first magnetic structure being a first magnetizable material having a first plurality of first printed maxels having a first polarity pattern;
      a second magnetic structure located inside said wall of said sealed container, said second magnetic structure being a second magnetizable material having a second plurality of second printed maxels having a second polarity pattern that is complementary to said first polarity pattern, said first magnetic structure and said second magnetic structure being magnetically coupled across said wall of said sealed container;
      a first adapter interface component located outside of a wall of said sealed container and associated with said first magnetic structure; and
      a second adapter interface component located inside said wall of said seated container and associated with said second magnetic structure and said moveable mixing part; and
   a movement control mechanism including a moveable handle associated with said first adapter interface and configured to control a movement of said magnetic coupling adapter and thereby a movement of said moveable mixing part to control flow and mixing of said hot and said cold water.

2. The valve assembly of claim 1, wherein said stationary mixing part comprises a first side and a second side apposite said first side.

3. The valve assembly of claim 2, wherein said first side of said stationary mixing part comprises first inlet configured to receive said hot water from said hot water supply line, a second inlet configured to receive said cold water from said cold water supply line, and an outlet for supplying at least one of said hot water and said cold water to said faucet, said first and second inlets and said outlet extending from said first side of said stationary mixing part to said second side of said stationary mixing part.

4. The valve assembly of claim 3, wherein said moveable mixing part comprises a first side and a second side opposite said first side.

5. The valve assembly of claim 4, wherein said first side of said moveable mixing part comprises an outer portion, an inner portion, and a channel.

6. The valve assembly of claim 5, wherein said second side of said stationary mixing part and said first side of said movable mixing part are configured to interface with each other to provide a seal intended to prevent leakage of at least one of said cold water and said hot water out of said valve mechanism.

7. The valve assembly of claim 5, wherein a location of said inner portion of said first side of said moveable mixing part relative to the first and second inlets of said second side of said stationary mixing part controls said flow and said mixing of said hot water and said cold water.

8. The valve assembly of claim 1, wherein said moveable handle is configured for rotational movement.

9. The valve assembly of claim 1, wherein said moveable handle is configured for translational movement.

10. The valve assembly of claim 1, wherein said movement control mechanism further comprises:
   a stem assembly attached to said handle and associated with said first adapter interface component.

11. The valve assembly of claim 10, where said stem assembly comprises a ball having a knuckle that can be placed into a recess of said first adapter interface component.

12. The valve assembly of claim 11, wherein said ball movable within a housing.

13. The valve assembly of claim 11, wherein movement of said ball is constrained.

14. The valve assembly of claim 1, wherein said movement of said moveable mixing part is a rotational movement.

15. The valve assembly of claim 1, wherein said movement of said moveable mixing part is a translational movement.

16. The valve assembly of claim 1, further comprising:
   a puck associated with said stationary mixing part.

17. The valve assembly of claim 16, further comprising:
   a gasket between said puck and said stationary mixing part.

18. The valve assembly of claim 1, further comprising:
   a tap between at least one of the cold water supply line and the hot water supply line and the sealed container.

19. The valve assembly of claim 18, further comprising a piston connected to said tap.

20. The valve assembly of claim 1, where the sealed container is filled with grease.

* * * * *